US012810464B2

(12) United States Patent
Handshaw et al.

(10) Patent No.: US 12,810,464 B2
(45) Date of Patent: Nov. 24, 2026

(54) SYSTEMS AND METHODS FOR OBJECT LOCATIONING TO INITIATE AN IDENTIFICATION SESSION

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 869 days.

(21) Appl. No.: 18/113,908

(22) Filed: Feb. 24, 2023

(65) Prior Publication Data

US 2024/0289979 A1 Aug. 29, 2024

(51) Int. Cl.

| | |
|---|---|
| ***G06T 7/73*** | (2017.01) |
| ***G06K 7/10*** | (2006.01) |
| ***G06K 7/14*** | (2006.01) |
| ***G06T 7/60*** | (2017.01) |
| ***G06V 10/22*** | (2022.01) |
| ***G06V 10/26*** | (2022.01) |
| ***G06V 10/98*** | (2022.01) |
| ***G06V 20/52*** | (2022.01) |
| ***G06V 20/64*** | (2022.01) |

(52) U.S. Cl.

CPC ............ *G06T 7/73* (2017.01); *G06K 7/10297* (2013.01); *G06K 7/1417* (2013.01); *G06T 7/60* (2013.01); *G06V 10/225* (2022.01); *G06V 10/987* (2022.01); *G06V 20/52* (2022.01); *G06V 20/64* (2022.01); *G06K 2007/10524* (2013.01); *G06V 10/26* (2022.01)

(58) Field of Classification Search

CPC ... G06T 7/73; G06T 7/60; G06K 2007/10524; G06K 7/1417; G06K 7/10297; G06V 10/26; G06V 10/225; G06V 20/64; G06V 20/52; G06V 10/987

See application file for complete search history.

(56) References Cited

U.S. PATENT DOCUMENTS 10,817,691 B1 * 10/2020 Wilfred ..................... G06T 7/13
2010/0155476 A1 * 6/2010 Ross ......................... H01S 1/02
235/454

(Continued)

*Primary Examiner* — John Villecco
*Assistant Examiner* — Alexander John Rodgers

(57) ABSTRACT

Systems and methods for object locationing to initiate an identification session are disclosed herein. An example method includes capturing, by a first imager of an imaging assembly, an image including image data of a target location at a checkout station. The example method further includes analyzing the image data to identify an object transportation apparatus positioned proximate to the target location, and determining, based on the image data, whether the object transportation apparatus is located within the target location. The example method further includes, responsive to determining that the object transportation apparatus is located within the target location, initiating, by a second imager of the imaging assembly, an identification session to verify that each object in the object transportation apparatus is included on a list of decoded indicia.

18 Claims, 8 Drawing Sheets

(56) References Cited

U.S. PATENT DOCUMENTS

| | | | | |
|---|---|---|---|---|
| 2010/0282841 | A1* | 11/2010 | Connell, II | G07G 1/0018 235/383 |
| 2019/0108396 | A1* | 4/2019 | Dal Mutto | G06V 10/82 |
| 2020/0096599 | A1* | 3/2020 | Hewett | G01S 13/878 |
| 2020/0273257 | A1* | 8/2020 | Annakov | G06T 15/08 |
| 2021/0110367 | A1* | 4/2021 | Sanders | G07G 1/009 |
| 2023/0252443 | A1* | 8/2023 | McDaniel | G06V 10/255 705/23 |
| 2023/0394831 | A1* | 12/2023 | Stankovic | G06V 10/25 |
| 2024/0194035 | A1* | 6/2024 | Bergmann | G06Q 20/208 |
| 2024/0242503 | A1* | 7/2024 | Musiani | G07G 3/003 |
| 2024/0256805 | A1* | 8/2024 | Barkan | G06K 7/10732 |
| 2025/0046161 | A1* | 2/2025 | Whitelaw | G06V 10/82 |

* cited by examiner

SYSTEMS AND METHODS FOR OBJECT LOCATIONING TO INITIATE AN IDENTIFICATION SESSION

BACKGROUND

Recently, with the proliferation of self-checkout lanes, many retail locations have encountered substantial issues during customer checkout (also referenced herein as an "identification session") relating to unidentified and/or misidentified objects. A primary factor influencing these issues is the positioning of the carts/baskets/etc., and the contents contained therein, by customers during such identification sessions. As a result, these issues are further compounded in hardware and other retail locations, where the objects are frequently large and difficult to maneuver.

Thus, there is a need for systems and methods for object locationing to quickly, efficiently, and accurately initiate an identification session, and thereby reduce/eliminate such issues related to unidentified and/or misidentified objects.

SUMMARY

In an embodiment, the present invention is a method for object locationing to initiate an identification session. The method may comprise: capturing, by a first imager of an imaging assembly, an image including image data of a target location at a checkout station; analyzing the image data to identify an object transportation apparatus positioned proximate to the target location; determining, based on the image data, whether the object transportation apparatus is located within the target location; and responsive to determining that the object transportation apparatus is located within the target location, initiating, by a second imager of the imaging assembly, an identification session to verify that each object in the object transportation apparatus is included on a list of decoded indicia.

In a variation of this embodiment, the imaging assembly comprises the second imager being disposed within a handheld scanning apparatus and the first imager being disposed within a base configured to receive the handheld scanning apparatus.

In another variation of this embodiment, determining whether the object transportation apparatus is located within the target location further comprises: determining, based on the image data, whether (i) the object transportation apparatus is located within the target location and (ii) each object within the object transportation apparatus is fully contained within a field of view (FOV) of the first imager; and responsive to determining that either (i) the object transportation apparatus is not located within the target location or (ii) one or more objects within the object transportation apparatus are not fully contained within the FOV, displaying, on a user interface, an alert indicating a direction for a user to move the object transportation apparatus.

In still another variation of this embodiment, analyzing the image data further comprises: identifying a floor marking that delineates the target location on a floor of the checkout station; and determining whether the object transportation apparatus is located within the target location further comprises: determining whether the object transportation apparatus is located within the floor marking on the floor of the checkout station. Further in this variation, the floor marking is a pattern projected onto the floor of the checkout station by one or more of: (a) an overhead lighting device, (b) a cradle lighting device, or (c) a lighting device mounted at a point of sale (POS) station.

In yet another variation of this embodiment, determining, based on the image data, whether the object transportation apparatus is located within the target location further comprises: determining whether a detection signal from a second device corresponds to the object transportation apparatus being located within the target location, wherein the second device is (a) a metal detector, (b) a radio frequency identification (RFID) detector, (c) a Near Field Communications (NFC) beacon, or (d) a Bluetooth® Low Energy (BLE) beacon.

In still another variation of this embodiment, the method further comprises: compiling, based on the image data, a list of object characteristics corresponding to one or more characteristics of each object within the object transportation apparatus; compiling, during the identification session, a list of decoded indicia including indicia of objects within the object transportation apparatus; detecting a termination of the identification session; comparing the list of decoded indicia to the list of object characteristics; and responsive to determining that (i) an indicia is not matched with one or more object characteristics or (ii) one or more object characteristics are not matched with an indicia, activating a mitigation. Further in this variation, the mitigation includes one or more of: (i) marking a receipt, (ii) triggering an alert, (iii) storing video data corresponding to the identification session, (iv) notifying a user, (v) a deactivation signal, (vi) an activation signal, (vii) transmitting an indicia to a point of sale (POS) host to include the indicia on the list of decoded indicia.

In yet another variation of this embodiment, the method further comprises: detecting, by an RFID detector during the identification session, an obscured object that is within the object transportation apparatus and is obscured from an FOV of the first imager; and obtaining, by the RFID detector, an object identifier for the obscured object.

In still another variation of this embodiment, the first imager is disposed within a base configured to receive a handheld scanning apparatus, the base being fixedly attached to a counter edge of the checkout station.

In yet another variation of this embodiment, the first imager is a two-dimensional (2D) camera, the image data is 2D image data of the target location and the object transportation apparatus, and wherein determining whether the object transportation apparatus is located within the target location further comprises: determining that a front edge, a left edge, and a right edge of the target location are unobscured in the 2D image data; determining a first dimension of the object transportation apparatus based on a plurality of features on the object transportation apparatus; comparing the first dimension to a known dimension of the object transportation apparatus; and responsive to determining that (i) the first dimension is substantially similar to the known dimension and (ii) that the front edge, the left edge, and the right edge of the target location are unobscured, determining that the object transportation apparatus is located within the target location. Further in this variation, the method further comprises: determining a relative dimension of each object within the object transportation apparatus based on the plurality of features on the object transportation apparatus.

In still another variation of this embodiment, the first imager is a three-dimensional (3D) camera, the image data is 3D image data of the target location and the object transportation apparatus, and wherein determining whether the object transportation apparatus is located within the target location further comprises: determining that a front edge, a left edge, and a right edge of the target location are unobscured in the 3D image data; determining a distance of a proximate face of the object transportation apparatus from the imaging assembly based on depth information included as part of the 3D image data corresponding to the object transportation apparatus; comparing the distance of the proximate face of the object transportation apparatus from the imaging assembly to a known distance of a proximate edge of the target location; and responsive to determining that (i) the distance of the proximate face is substantially similar to the known distance of the proximate edge and (ii) that the front edge, the left edge, and the right edge of the target location are unobscured, determining that the object transportation apparatus is located within the target location.

In yet another variation of this embodiment, the object transportation apparatus is a shopping cart, and the method further comprises: detecting, based on the image data, a first object under a basket portion of the shopping cart; and determining, during the identification session, that a user has moved a scanning device sufficient to scan the first object, wherein the determining is based on one or more of: (i) an internal accelerometer signal, (ii) an elevation sensor signal, (iii) image data indicating that the scanning device is positioned to capture data of the first object, or (iv) signal data from a second device.

In still another variation of this embodiment, the first imager is disposed within a handheld scanning apparatus, and the image is captured prior to decoupling the handheld scanning apparatus from a base.

In another embodiment, the present invention is an imaging device for object locationing to initiate an identification session. The imaging device comprises: an imaging assembly having a first imager and a second imager, the first imager being configured to capture an image including image data of a target location at a checkout station; and one or more processors communicatively coupled with the imaging assembly that are configured to: analyze the image data to identify an object transportation apparatus positioned proximate to the target location, determine, based on the image data, whether the object transportation apparatus is located within the target location, and responsive to determining that the object transportation apparatus is located within the target location, initiate, by the second imager, an identification session to verify that each object in the object transportation apparatus is included on a list of decoded indicia.

In a variation of this embodiment, the imaging assembly comprises a handheld scanning apparatus and a base configured to receive the handheld scanning apparatus, the first imager is disposed within the base, and the second imager is disposed within the handheld scanning apparatus.

In another variation of this embodiment, the imaging device further comprises a user interface, and wherein the one or more processors are further configured to: determine, based on the image data, whether (i) the object transportation apparatus is located within the target location and (ii) each object within the object transportation apparatus is fully contained within a FOV of the first imager; and responsive to determining that either (i) the object transportation apparatus is not located within the target location or (ii) one or more objects within the object transportation apparatus are not fully contained within the FOV, display, on the user interface, an alert indicating a direction for a user to move the object transportation apparatus.

In still another variation of this embodiment, the first imager is a three-dimensional (3D) camera, the image data is 3D image data of the target location and the object transportation apparatus, and wherein the one or more processors are further configured to determine whether the object transportation apparatus is located within the target location by: determining that a front edge, a left edge, and a right edge of the target location are unobscured in the 3D image data; determining a distance of a proximate face of the object transportation apparatus from the imaging assembly based on depth information included as part of the 3D image data corresponding to the object transportation apparatus; comparing the distance of the proximate face of the object transportation apparatus from the imaging assembly to a known distance of a proximate edge of the target location; and responsive to determining that (i) the distance of the proximate face is substantially similar to the known distance of the proximate edge and (ii) that the front edge, the left edge, and the right edge of the target location are unobscured, determining that the object transportation apparatus is located within the target location.

In yet another embodiment, the present invention is a tangible machine-readable medium comprising instructions for object locationing to initiate an identification session that, when executed, cause a machine to at least: receive an image including image data of a target location within a field of view (FOV) of a first imager of an imaging assembly positioned at a checkout station; analyze the image data to identify an object transportation apparatus positioned proximate to the target location; determine, based on the image data, whether the object transportation apparatus is located within the target location; and responsive to determining that the object transportation apparatus is located within the target location, initiate, by a second imager of the imaging assembly, an identification session to verify that each object in the object transportation apparatus is included on a list of decoded indicia.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
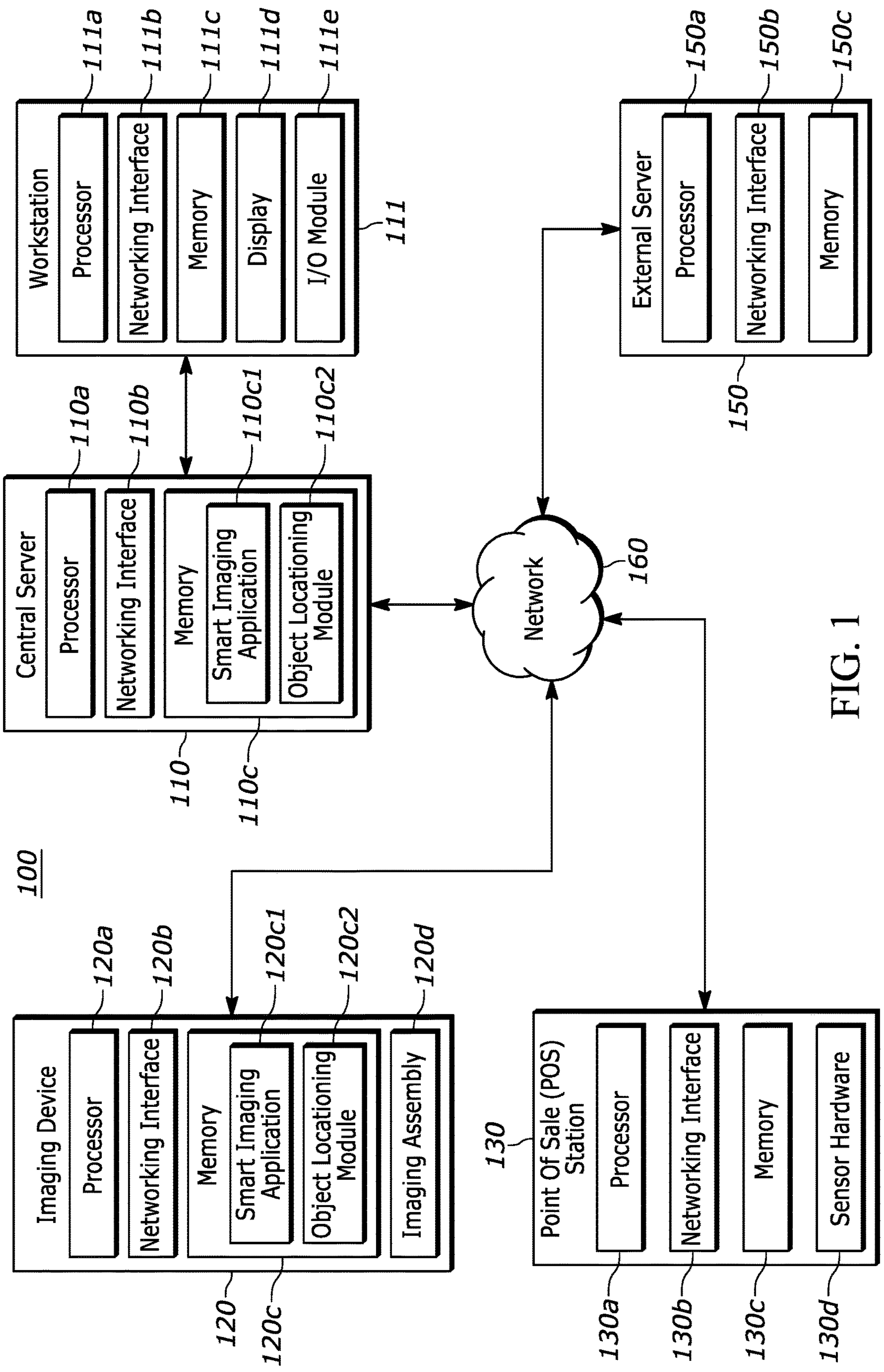
FIG. 1 is an example computing system for object locationing to initiate an identification session, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventional techniques for initiating and performing identification sessions, particularly in self-checkout lanes, suffers from several drawbacks. For example, customers commonly place their carts/baskets/etc. (collectively referenced herein as "object transportation apparatus") in locations that negatively impact the capabilities of scanning and/or other devices configured to locate/identify the objects contained therein. These issues are further exasperated by large, unwieldy objects (e.g., lumber, heavy power tools, sheet metal/piping) that customers are frequently unable to move within the object transportation apparatus. As a result, conventional systems frequently leave objects unidentified and/or misidentified during identification sessions.

Thus, it is an objective of the present disclosure to eliminate these and other problems with such conventional techniques by providing systems and methods for object locationing to initiate an identification session. The systems and methods of the present disclosure thereby ensure that the object transportation apparatus is properly positioned, such that each object contained therein may be identified and accounted for prior to initiating an identification session. In this manner, the systems and methods of the present disclosure may provide more reliable, accurate, and efficient object locationing than conventional techniques, and may significantly increase successful object locationing/dimensioning/identification rates, increase correspondence rates between located/identified objects and scanned objects, and generally ensure that identification sessions take place in a secure and expedient fashion.

In accordance with the above, and with the disclosure herein, the present disclosure includes improvements in computer functionality or in improvements to other technologies at least because the present disclosure describes that, e.g., object locationing systems, and their related various components, may be improved or enhanced with the disclosed methods and systems that provide accurate and efficient object locationing/dimensioning/identification for respective users and administrators. That is, the present disclosure describes improvements in the functioning of an object locationing system itself or "any other technology or technical field" (e.g., the field of object locationing systems) because the disclosed methods and systems improve and enhance operation of object locationing systems by introducing improved object transportation apparatus tracking, and identification session security that reduce and/or eliminate many inefficiencies typically experienced over time by object locationing systems lacking such methods and systems. This improves the state of the art at least because such previous object locationing systems can be inefficient and inaccurate due to issues associated with object transportation apparatus tracking and identification session security.

In addition, the present disclosure includes applying various features and functionality, as described herein, with, or by use of, a particular machine, e.g., an imaging device, a POS station, a central server, a workstation, and/or other hardware components as described herein.

Moreover, the present disclosure includes specific features other than what is well-understood, routine, conventional activity in the field, or adding unconventional steps that demonstrate, in various embodiments, particular useful applications, e.g., analyzing the image data to identify an object transportation apparatus positioned proximate to the target location; determining, based on the image data, whether (i) the object transportation apparatus is located within the target location and (ii) each object within the object transportation apparatus is fully contained within the FOV; and/or responsive to determining that the object transportation apparatus is located within the target location and that each object within the object transportation apparatus is fully contained within the FOV, initiating an identification session to identify each object in the object transportation apparatus.

Turning to the Figures, FIG. 1 is an example computing system 100 for object locationing to initiate an identification session, in accordance with embodiments described herein. Depending on the embodiment, the example computing system 100 may analyze image data to determine whether an object transportation apparatus is located within a target location, whether each object within the object transportation apparatus is fully contained within the FOV, initiate/terminate an identification session to identify each object in the object transportation apparatus, generate/transmit deactivation signals to objects that are not identified, and/or any other actions or combinations thereof. Of course, it should be appreciated that, while the various components of the example computing system 100 (e.g., central server 110, workstation 111, imaging device 120, POS station 130, external server 150, etc.) are illustrated in FIG. 1 as single components, the example computing system 100 may include multiple (e.g., dozens, hundreds, thousands) of each of the components that are simultaneously connected to the network 160 at any given time.

Generally, the example computing system 100 may include a central server 110, a workstation 111, an imaging device 120, a POS station 130, and an external server 150. The central server 110 may generally receive data from the imaging device 120 corresponding to customers, carts, and/or other objects located within a store (e.g., a grocery store) or other suitable location, and may process the data in accordance with one or more sets of instructions contained in the memory 110*c* to perform any of the actions previously described. The central server 110 may include one or more processors 110*a*, a networking interface 110*b*, and a memory 110*c*. The memory 110*c* may include various sets of executable instructions that are configured to analyze data received at the central server 110 and analyze that data to output various values. These executable instructions include, for example, a smart imaging application 110*c*1, and an object locationing module 110*c*2.

More specifically, the central server 110 may be configured to receive and/or otherwise access data from various devices (e.g., imaging device 120, POS station 130), and may utilize the processor(s) 110*a* to execute the instructions stored in the memory 110*c* to analyze and/or otherwise process the received data. As an example, the central server 110 may receive image data from the imaging device 120 that features (1) a customer that has recently entered a FOV of the imaging device 120 at a checkout location and (2) an object transportation apparatus corresponding to the customer. The central server 110 may utilize the processor(s) 110*a* in accordance with instructions included as part of the object locationing module 110*c*2 to analyze the image data of the object transportation apparatus to determine whether the object transportation apparatus is located within the target location. Accordingly, the central server 110 may utilize the processor(s) 110*a* to determine that the object transportation apparatus is located within the target location, such that the customer does not need to move the apparatus.

As another example, the central server 110 may receive image data from the imaging device 120 featuring a customer and their object transportation apparatus. The instructions included as part of the object locationing module 110*c*2 may cause the processor(s) 110*a* to analyze the image data to determine whether each object within the apparatus is fully contained within the FOV of the imaging device 120, and the processor(s) 110*a* may determine that at least one object is not fully contained within the device 120 FOV. For the purposes of discussion, an item may be contained within a FOV regardless of the visibility of the object. In particular, an object may be considered fully contained within the FOV as long as no portion of the object extends beyond the volume of the FOV.

In any event, the central server 110 may then execute additional instructions included as part of the object locationing module 110*c*2 to generate an alert indicating a direction for the user to move the object transportation apparatus, such that all objects contained therein may be fully contained within the device 120 FOV. For example, a large sheet of plywood may extend above the device 120 FOV when the customer initially positions their object transportation apparatus (e.g., a cart) in the device 120 FOV. Accordingly, the alert generated by the central server 110 may instruct the customer to move the object transportation apparatus away from the imaging device 120. These instructions may include a visual indication for the customer to move the object transportation apparatus, audible instructions, and/or any other suitable indications or combinations thereof.

The imaging device 120 may include one or more processors 120*a*, a networking interface 120*b*, one or more memories 120*c*, an imaging assembly 120*d*, the smart imaging application 120*c*1, and the object locationing module 120*c*2. Broadly, the imaging device 120 may be a digital camera and/or digital video camera that may be installed in a charging cradle of a handheld scanning device located at a checkout station within a retail location (e.g., grocery store, hardware store, etc.). For example, and as described herein, the imaging device 120 may be positioned near an edge of a counter of the checkout location, and may thus have a FOV that includes a target location proximate to the counter of the checkout location where customers may position object transportation apparatuses while performing an identification session. In certain embodiments, the charging cradle may be fixedly attached to the counter of the checkout location, such that the imaging device 120 may also be fixedly attached to the counter. Further, in some embodiments, the charging cradle may charge a battery of the handheld scanning device when the handheld scanning device is coupled to the charging cradle.

In this manner, the imaging device 120 may capture image data of object transportation apparatuses (and the objects contained therein) prior to and during identification sessions to enable the components of the system 100 to perform object locationing/dimensioning/identification on the objects contained within the object transportation apparatuses. Of course, it should be appreciated that the imaging device 120 may be installed at any suitable location, including as a standalone device configured to capture image data of the target location at the checkout station.

In any event, and as mentioned, the imaging assembly 120*d* may include a digital camera and/or digital video camera for capturing or taking digital images and/or frames. In particular, the imaging assembly 120*d* may include multiple imagers that are disposed in various components. For example, the imaging assembly 120*d* may include a first imager that is disposed within a base or charging cradle that is configured to receive a handheld scanning apparatus, and the assembly 120*d* may include a second imager that is disposed within the handheld scanning apparatus. The first imager may be configured to capture image data of a target location at a checkout station, and the second imager may be configured to initiate and perform image data capture corresponding to an identification session. Namely, a user/customer may remove/decouple the handheld scanning apparatus from the charging cradle/base when the object transportation apparatus is properly positioned within the target location (e.g., based on image data captured by the first imager), and the user/customer may proceed to capture image data via the second imager in the handheld scanning device corresponding to indicia of target objects.

In any event, each digital image may comprise pixel data that may be analyzed in accordance with instructions comprising the smart imaging application 120*c*1 and/or the object locationing module 120*c*2, as executed by the one or more processors 120*a*, as described herein. The digital camera and/or digital video camera of, e.g., the imaging assembly 120*d* may be configured to take, capture, or otherwise generate digital images and, at least in some embodiments, may store such images in a memory (e.g., one or more memories 110*c*, 120*c*) of a respective device (e.g., central server 110, imaging device 120).

For example, the imaging assembly 120*d* may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 120*d* may capture 2D images, and related 2D image data, at the same or similar point in time as the 3D camera of the imaging assembly 120*d* such that the imaging device 120 can have both sets of 3D image data and 2D image data available for a particular surface, object, area, or scene at the same or similar instance in time. In various embodiments, the imaging assembly 120*d* may include the 3D camera and the photo-realistic camera as a single imaging apparatus configured to capture 3D depth image data simultaneously with 2D image data. As such, the captured 2D images and the corresponding 2D image data may be depth-aligned with the 3D images and 3D image data.

The imaging device 120 may also process the 2D image data/datasets and/or 3D image datasets for use by other devices (e.g., the central server 110, the workstation 111). For example, the one or more processors 120*a* may process the image data or datasets captured, scanned, or sensed by the imaging assembly 120*d*. The processing of the image data may generate post-imaging data that may include metadata, simplified data, normalized data, result data, status data, or alert data as determined from the original scanned or sensed image data. The image data and/or the post-imaging data may be sent to the central server 110 executing, for example, the smart imaging application 110*c*1 and/or the object locationing module 110*c*2 for viewing, manipulation, and/or otherwise interaction. In other embodiments, the image data and/or the post-imaging data may be sent to a server (e.g., central server 110) for storage or for further manipulation. As described herein, the central server 110, imaging device 120, and/or external server or other centralized processing unit and/or storage may store such data, and may also send the image data and/or the post-imaging data to another application implemented on a user device, such as a mobile device, a tablet, a handheld device, or a desktop device.

Moreover, it should be understood that, in certain embodiments, the workstation 111, the imaging device 120, the POS station 130, and/or the external server 150 may perform any/all of the calculations, determinations, and/or other actions described herein in reference to the central server 110. For example, the imaging device 120 may be configured to execute machine vision tasks and machine vision jobs that perform one or more of the actions described herein. Namely, the imaging device 120 may obtain a job file containing one or more job scripts from the central server 110 (or other suitable source) across the network 160 that may define the machine vision job and may configure the imaging device 120 to capture and/or analyze images in accordance with the machine vision job. The imaging device 120 may include flash memory used for determining, storing, or otherwise processing imaging data/datasets and/or post-imaging data.

The imaging device 120 may then receive, recognize, and/or otherwise interpret a trigger that causes the imaging device 120 to capture an image of the target object or capture multiple images (or video) of multiple target objects (e.g., customers and carts in a store) in accordance with the configuration established via the one or more job scripts. Once captured and/or analyzed, the imaging device 120 may transmit the images and any associated data across the network 160 to the central server 110 for further analysis and/or storage. Additionally, or alternatively, the imaging device 120 may be a "smart" camera and/or may otherwise be configured to automatically perform sufficient functionality of the imaging device 120 to obtain, interpret, and execute job scripts that define machine vision jobs, such as any one or more job scripts contained in one or more job files as obtained, for example, from the central server 110.

In addition, the imaging device 120 may include a networking interface 120*b* that enables connectivity to a computer network (e.g., network 160). For example, the networking interface 120*b* may allow the imaging device 120 to connect to a network, such as a Gigabit Ethernet connection and/or a Dual Gigabit Ethernet connection. Further, the imaging device 120 may include transceivers and/or other communication components as part of the networking interface 120*b* to communicate with other devices (e.g., the central server 110) via, for example, Ethernet/IP, PROFINET, Modbus TCP, CC-Link, USB 3.0, RS-232, and/or any other suitable communication protocol or combinations thereof.

Regardless, to execute these or other instructions stored in memory 110*c*, the central server 110 may communicate with a workstation 111. The workstation 111 may generally be any computing device that is communicatively coupled with the central server 110, and more particularly, may be a computing device with administrative permissions that enable a user accessing the workstation 111 to update and/or otherwise change data/models/applications that are stored in the memory 110*c*. The workstation 111 may also be generally configured to enable a user/operator to, for example, create and upload a machine vision job for execution and/or otherwise interact with the imaging device 120. The user/operator may transmit/upload any configuration adjustment, software updates, and/or any other suitable information to the imaging device 120 via the network 160, where the information is then interpreted and processed accordingly.

For example, the workstation 111 may enable a user to access the central server 110, and the user may train models that are included as part of the smart imaging application 110*c*1 and/or the object locationing module 110*c*2 that are stored in the memory 110*c*. The workstation 111 may include one or more processors 111*a*, a networking interface 111*b*, a memory 111*c*, a display 111*d*, and an input/output (I/O) module 111*e*. Generally, the smart imaging application 110*c*1, 120*c*1 may include and/or otherwise comprise executable instructions (e.g., via the one or more processors 110*a*, 120*a*) that allow a user to configure a machine vision job and/or imaging settings of the imaging device 120. For example, the smart imaging application 110*c*1, 120*c*1 may render a graphical user interface (GUI) on a display 111*d* of the workstation 111, and the user may interact with the GUI to change various settings, modify machine vision jobs, input data, etc. Moreover, the smart imaging application 110*c*1, 120*c*1 may output results of the executed machine vision job for display to the user, and the user may again interact with the GUI to approve the results, modify imaging settings to re-perform the machine vision job, and/or any other suitable input or combinations thereof.

In certain embodiments, the smart imaging application 110*c*1, 120*c*1 may also include and/or otherwise comprise executable instructions (e.g., via the one or more processors 110*a*, 120*a*) that identify and decode indicia located on objects within object transportation apparatuses based on images captured by the imaging device 120. The smart imaging application 110*c*1, 120*c*1 may also train models to perform this identification and decoding. For example, image data captured by the imaging device 120 may include customers within a store and object transportation apparatuses disposed proximate to the customers at a checkout station. The one or more processors 110*a*, 120*a* may execute a trained image analysis model, which is a part of the smart imaging application 110*c*1, 120*c*1, to identify indicia on the objects in the object transportation apparatus and to decode the indicia. Of course, the smart imaging application 110*c*1 may perform additional, fewer, and/or other tasks.

The object locationing module 110*c*2, 120*c*2 may include and/or otherwise comprise executable instructions (e.g., via the one or more processors 110*a*, 120*a*) that determine whether an object transportation apparatus, and the objects contained therein, are within the FOV of the imaging device and within the target location of the checkout station based on images captured by the imaging device 120. Further, the object locationing module 110*c*2, 120*c*2 may include instructions that initiate an identification session in response to determining that both the object transportation apparatus and the objects contained therein are appropriately positioned within the FOV of the imaging device 120. The object locationing module 110*c*2, 120*c*2 may also train models to perform these actions. For example, image data captured by the imaging device 120 may include customers and object transportation apparatuses disposed proximate to the customers at a target location of a checkout station. The one or more processors 110*a*, 120*a* may execute a trained object locationing model, which is a part of the object locationing module 110*c*2, 120*c*2, to evaluate the locations of the object transportation apparatus and the objects contained therein, and to initiate identification sessions accordingly.

As discussed herein, in certain embodiments, one or more of the models that are included as part of the smart imaging application 110*c*1 and/or the object locationing module

110*c*2 may be trained by and may implement machine learning (ML) techniques. In these embodiments, the user accessing the workstation 111 may upload training data, execute training sequences to train the models, and/or may update/re-train the models over time.

Of course, in certain embodiments, any of the models that are included as part of the smart imaging application 110*c*1 and/or the object locationing module 110*c*2 may be a rules-based algorithm configured to receive sets of image data and/or other data as an input and to output determinations regarding locations of object transportation apparatuses and objects contained therein, identification session initiation signals, deactivation signals, and/or other suitable values or combinations thereof.

In some embodiments, the central server 110 may store and execute instructions that may generally train the various models that are included as part of the smart imaging application 110*c*1 and/or the object locationing module 110*c*2 and stored in the memory 110*c*. For example, the central server 110 may execute instructions that are configured to utilize training dataset(s) to train models that are included as part of the smart imaging application 110*c*1 to identify/decode indicia (e.g., barcodes, quick response (QR) codes, etc.), and/or train models that are included as part of the object locationing module 110*c*2 to output determinations regarding locations of object transportation apparatuses and objects contained therein, identification session initiation signals, and/or deactivation signals. In particular, the training dataset(s) may include a plurality of training image data and/or any other suitable data and combinations thereof.

Generally, ML techniques have been developed that allow parametric or nonparametric statistical analysis of large quantities of data. Such ML techniques may be used to automatically identify relevant variables (e.g., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. More specifically, a processor or a processing element may be trained using supervised or unsupervised ML.

In supervised machine learning, a machine learning program operating on a server, computing device, or otherwise processors, may be provided with example inputs (e.g., "features") and their associated, or observed, outputs (e.g., "labels") for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided to subsequent inputs for the model, executing on a server, computing device, or otherwise processors as described herein, to predict or classify, based upon the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

Exemplary ML programs/algorithms that may be utilized by the central server 110 to train the models that are included as part of the smart imaging application 110*c*1 and/or the object locationing module 110*c*2 may include, without limitation: neural networks (NN) (e.g., convolutional neural networks (CNN), deep learning neural networks (DNN), combined learning module or program), linear regression, logistic regression, decision trees, support vector machines (SVM), naïve Bayes algorithms, k-nearest neighbor (KNN) algorithms, random forest algorithms, gradient boosting algorithms, Bayesian program learning (BPL), voice recognition and synthesis algorithms, image or object recognition, optical character recognition (OCR), natural language understanding (NLU), and/or other ML programs/algorithms either individually or in combination.

After training, ML programs (or information generated by such ML programs) may be used to evaluate additional data. Such data may be and/or may be related to image data and/or other data that was not included in the training dataset. The trained ML programs (or programs utilizing models, parameters, or other data produced through the training process) may accordingly be used for determining, assessing, analyzing, predicting, estimating, evaluating, or otherwise processing new data not included in the training dataset. Such trained ML programs may, therefore, be used to perform part or all of the analytical functions of the methods described elsewhere herein.

It is to be understood that supervised ML and/or unsupervised ML may also comprise retraining, relearning, or otherwise updating models with new, or different, information, which may include information received, ingested, generated, or otherwise used over time. The disclosures herein may use one or more of such supervised and/or unsupervised ML techniques. Further, it should be appreciated that, as previously mentioned, the models that are included as part of the smart imaging application 110*c*1 and/or the object locationing module 110*c*2 may be used to identify/decode indicia, output determinations regarding locations of object transportation apparatuses and objects contained therein, identification session initiation signals, and/or deactivation signals, using artificial intelligence (e.g., a ML model of the smart imaging application 110*c*1 and/or the object locationing module 110*c*2) or, in alternative aspects, without using artificial intelligence.

Moreover, although the methods described elsewhere herein may not directly mention ML techniques, such methods may be read to include such ML for any determination or processing of data that may be accomplished using such techniques. In some aspects, such ML techniques may be implemented automatically upon occurrence of certain events or upon certain conditions being met. In any event, use of ML techniques, as described herein, may begin with training a ML program, or such techniques may begin with a previously trained ML program.

When the models that are included as part of the smart imaging application 110*c*1 and/or the object locationing module 110*c*2 determine that an object transportation apparatus is located within the target location and that each object within the object transportation apparatus is fully contained within the FOV, the central server 110 may generate an identification session initiation signal that initiates an identification session to scan objects contained within the object transportation apparatus. For example, the models that are included as part of the object locationing module 110*c*2 may receive image data of a customer and an object transportation apparatus proximate to a target location at a checkout station. The models may analyze the image data and determine that both (i) the object transportation apparatus is located within the target location and (ii) each object within the object transportation apparatus is fully contained within the FOV. Accordingly, the central server 110 may generate an identification session initiation signal indicating that the customer has positioned the object transportation apparatus (and objects contained therein) in an appropriate position where the objects in the apparatus may be dimensioned and identified during an identification session.

The central server 110 may then transmit the identification session initiation signal to a POS station 130 and/or other suitable device for display to a user (e.g., store manager). Once received, the POS station 130 may unlock and/or otherwise enable the customer to begin scanning indicia of objects contained within the object transportation apparatus for the customer to checkout. Such identification session initiation signal may also be or include a phone call, an email, a text message, an alphanumeric message presented on a POS station 130 display, a flashing light, an audible sound/alarm, a haptic signal, and/or any other signal transmitted across any suitable communication medium to, for example, a store employee device.

Regardless, the central server 110 may transmit the outputs of any models that are included as part of the smart imaging application 110*c*1 and/or the object locationing module 110*c*2 and/or other instructions executed by the processor(s) 110*a* to the workstation 111 and/or the POS station 130 that is operated by a user/employee/manager associated with a store. The user may then view the workstation 111 and/or the POS station 130 to determine how to proceed, as indicated in the alert(s) transmitted by the central server 110. For example, the central server 110 may transmit an alert signal to the workstation 111 indicating that a first object identified in the object transportation apparatus of a customer has not been scanned by scanning device corresponding with the POS station 130. The user may view this alert on the workstation 111, and may proceed with alerting security, prompting the POS station 130 to issue an alert to the customer, and/or any other suitable action(s) or combinations thereof.

The POS station 130 may generally include a processor 130*a*, a networking interface 130*b*, a memory 130*c* storing timing instructions 130*c*1, and sensor hardware 130*d*. The sensor hardware 130*d* may generally be or include any suitable hardware for scanning items for purchase, tracking customer movement at the POS station 130, and/or any other suitable hardware or combinations thereof.

The external server 150 may be or include computing servers and/or combinations of multiple servers storing data that may be accessed/retrieved by the central server 110, the workstation 111, the imaging device 120, and/or the POS station 130. The data stored by the external server 150 may include customer data, for example, as stored in the customer database 110*c*3. Generally, the data or other information stored in the memory 150*c* may be accessed, retrieved, and/or otherwise received by the central server 110, and may be utilized by the models that are included as part of the smart imaging application 110*c*1 and/or the object locationing module 110*c*2 to generate the outputs of those models. The external server 150 may include a processor 150*a*, a networking interface 150*b*, and a memory 150*c*.

The central server 110 may be communicatively coupled to the workstation 111, the imaging device 120, the POS station 130, and/or the external server 150. For example, the central server 110, the workstation 111, the imaging device 120, the POS station 130, and/or the external server 150 may communicate via USB, Bluetooth, Wi-Fi Direct, Near Field Communication (NFC), etc. For example, the central server 110 may transmit an alert to the workstation 111 and/or the POS station 130 via the networking interface 110*b*, which the workstation 111 and/or the POS station 130 may receive via the respective networking interface 111*b*, 130*b*.

Each of the one or more memories 110*c*, 111*c*, 120*c*, 130*c*, 150*c* may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 110*c*1, 120*c*1, object locationing module 110*c*2, 120*c*2, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 110*a*, 111*a*, 120*a*, 130*a*, 150*a* (e.g., working in connection with the respective operating system in the one or more memories 110*c*, 111*c*, 120*c*, 130*c*, 150*c*) to facilitate, implement, and/or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110*c*, 111*c*, 120*c*, 130*c*, 150*c* may store an operating system (OS) (e.g., Microsoft Windows, Linux, Unix, etc.) capable of facilitating the functionalities, apps, methods, or other software as discussed herein. The one or more memories 110*c*, 111*c*, 120*c*, 130*c*, 150*c* may also store the smart imaging application 110*c*1, 120*c*1 and/or the object locationing module 110*c*2, 120*c*2. The one or more memories 110*c*, 111*c*, 120*c*, 130*c*, 150*c* may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision and/or machine learning based imaging application, such as the smart imaging application 110*c*1, 120*c*1 and/or the object locationing module 110*c*2, 120*c*2, where each may be configured to facilitate their various functionalities discussed herein. It should be appreciated that one or more other applications may be envisioned and are executed by the one or more processors 110*a*, 111*a*, 120*a*, 130*a*, 150*a*.

The one or more processors 110*a*, 111*a*, 120*a*, 130*a*, 150*a* may be connected to the one or more memories 110*c*, 111*c*, 120*c*, 130*c*, 150*c* via a computer bus responsible for transmitting electronic data, data packets, or otherwise electronic signals to and from the one or more processors 110*a*, 111*a*, 120*a*, 130*a*, 150*a* and one or more memories 110*c*, 111*c*, 120*c*, 130*c*, 150*c* to implement or perform the machine readable instructions, methods, processes, elements or limitations, as illustrated, depicted, or described for the various flowcharts, illustrations, diagrams, figures, and/or other disclosure herein.

The one or more processors 110*a*, 111*a*, 120*a*, 130*a*, 150*a* may interface with the one or more memories 110*c*, 111*c*, 120*c*, 130*c*, 150*c* via the computer bus to execute the operating system (OS). The one or more processors 110*a*, 111*a*, 120*a*, 130*a*, 150*a* may also interface with the one or more memories 110*c*, 111*c*, 120*c*, 130*c*, 150*c* via the computer bus to create, read, update, delete, or otherwise access or interact with the data stored in the one or more memories 110*c*, 111*c*, 120*c*, 130*c*, 150*c* and/or external databases (e.g., a relational database, such as Oracle, DB2, MySQL, or a NoSQL based database, such as MongoDB). The data stored in the one or more memories 110*c*, 111*c*, 120*c*, 130*c*, 150*c* and/or an external database may include all or part of any of the data or information described herein, including, for example, the customer database 110*c*3 and/or other suitable information.

The networking interfaces 110*b*, 111*b*, 120*b*, 130*b*, 150*b* may be configured to communicate (e.g., send and receive) data via one or more external/network port(s) to one or more networks or local terminals, such as network 160, described herein. In some embodiments, the networking interfaces 110*b*, 111*b*, 120*b*, 130*b*, 150*b* may include a client-server platform technology such as ASP.NET, Java J2EE, Ruby on Rails, Node.js, a web service or online API, responsive for receiving and responding to electronic requests. The networking interfaces 110*b*, 111*b*, 120*b*, 130*b*, 150*b* may implement the client-server platform technology that may interact, via the computer bus, with the one or more memories 110*c*, 111*c*, 120*c*, 130*c*, 150*c* (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 110*b*, 111*b*, 120*b*, 130*b*, 150*b* may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 160. In some embodiments, the network 160 may comprise a private network or local area network (LAN). Additionally, or alternatively, the network 160 may comprise a public network such as the Internet. In some embodiments, the network 160 may comprise routers, wireless switches, or other such wireless connection points communicating to the network interfaces 110*b*, 111*b*, 120*b*, 130*b*, 150*b* via wireless communications based on any one or more of various wireless standards, including by non-limiting example, IEEE 802.11a/b/c/g (WIFI), the BLUETOOTH standard, or the like.

The I/O module 111*e* may include or implement operator interfaces configured to present information to an administrator or operator and/or receive inputs from the administrator or operator. An operator interface may provide a display screen (e.g., via the workstation 111) which a user/operator may use to visualize any images, graphics, text, data, features, pixels, and/or other suitable visualizations or information. For example, the workstation 111, the central server 110, the imaging device 120, and/or the POS station 130 may comprise, implement, have access to, render, or otherwise expose, at least in part, a graphical user interface (GUI) for displaying images, graphics, text, data, features, pixels, and/or other suitable visualizations or information on the display screen. The I/O module 111*e* may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the workstation 111. According to some embodiments, and as previously mentioned, an administrator or user/operator may access the workstation 111 to initiate imaging setting calibration, review images or other information, make changes, input responses and/or selections, and/or perform other functions.

As described above herein, in some embodiments, the central server 110 may perform the functionalities as discussed herein as part of a "cloud" network or may otherwise communicate with other hardware or software components within the cloud to send, retrieve, or otherwise analyze data or information described herein. Moreover, it will be understood that the above disclosure is one example and does not necessarily describe every possible embodiment. As such, it will be further understood that alternate embodiments may include fewer, alternate, and/or additional steps or elements.

Figure 2:
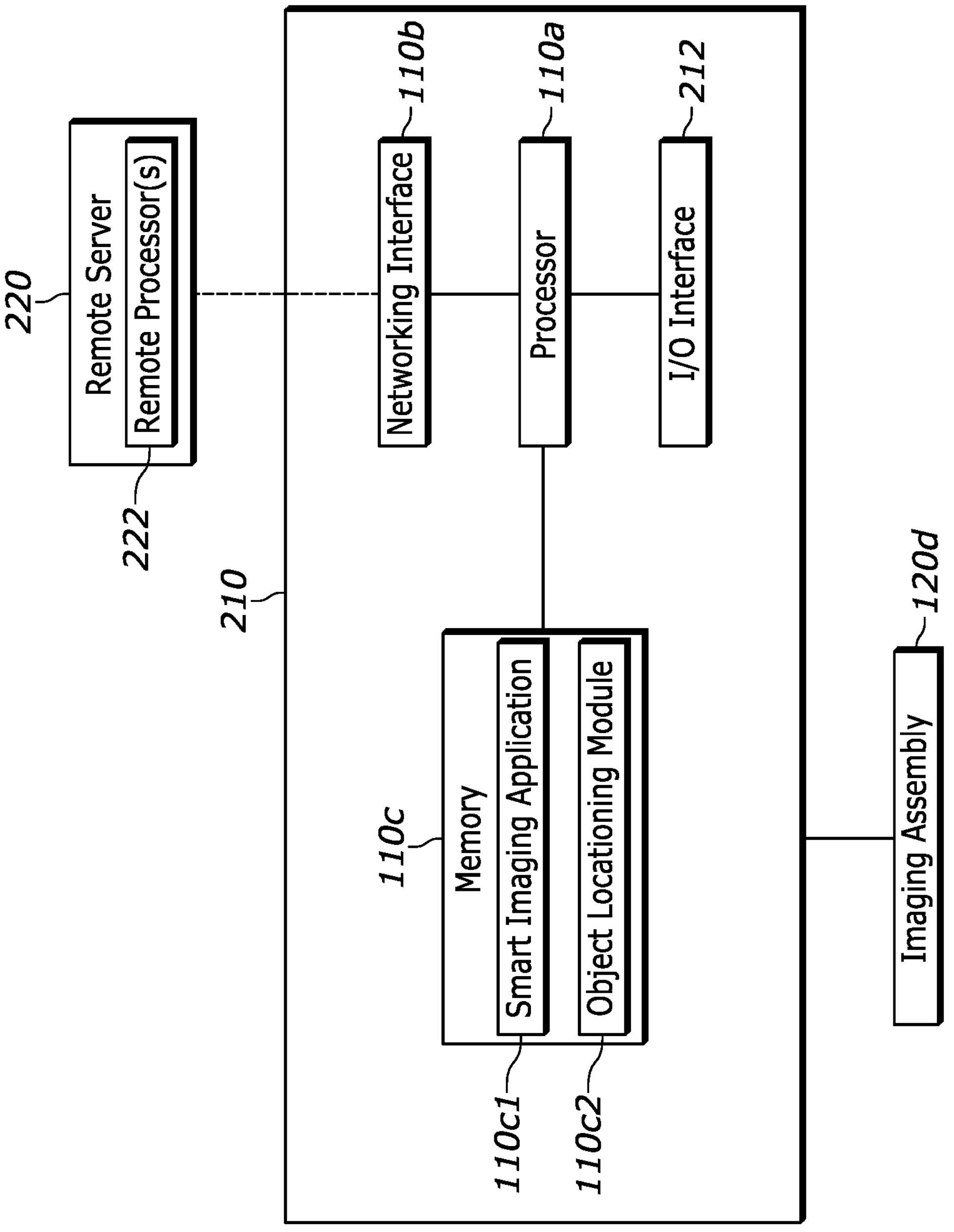
FIG. 2 is a block diagram of an example logic circuit for implementing example methods and/or operations described herein.

FIG. 2 is a block diagram representative of an example logic circuit capable of implementing, for example, one or more components of the central server 110 of FIG. 1. The example logic circuit of FIG. 2 is a processing platform 210 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 210 of FIG. 2 includes a processor 110*a* such as, for example, one or more microprocessors, controllers, and/or any suitable type of processor. The example processing platform 210 of FIG. 2 includes memory (e.g., volatile memory, non-volatile memory) 110*c* accessible by the processor 110*a* (e.g., via a memory controller). The example processor 110*a* interacts with the memory 110*c* to obtain, for example, machine-readable instructions stored in the memory 110*c* corresponding to, for example, the operations represented by the flowcharts of this disclosure. The memory 110*c* also includes the smart imaging application 110*c*1, the object locationing module 110*c*2, and the customer database 110*c*3, that are each accessible by the example processor 110*a*.

The smart imaging application 110*c*1 and/or the object locationing module 110*c*2 may comprise or represent rule-based instructions, an artificial intelligence (AI) and/or machine learning-based model(s), and/or any other suitable algorithm architecture or combination thereof configured to, for example, perform object locationing to initiate an identification session. To illustrate, the example processor 110*a* may access the memory 110*c* to execute the smart imaging application 110*c*1 and/or the object locationing module 110*c*2 when the imaging device 120 (via the imaging assembly 120*d*) captures a set of image data comprising pixel data from a plurality of pixels. Additionally, or alternatively, machine-readable instructions corresponding to the example operations described herein may be stored on one or more removable media (e.g., a compact disc, a digital versatile disc, removable flash memory, etc.) that may be coupled to the processing platform 210 to provide access to the machine-readable instructions stored thereon.

The example processing platform 210 of FIG. 2 also includes a network interface 110*b* to enable communication with other machines via, for example, one or more networks. The example network interface 110*b* includes any suitable type of communication interface(s) (e.g., wired and/or wireless interfaces) configured to operate in accordance with any suitable protocol(s) (e.g., Ethernet for wired communications and/or IEEE 802.11 for wireless communications). For example, the example processing platform 210 may be communicatively connected with the imaging assembly 120*d* through the network interface 110*b*, such that the platform 210 may receive image data from the assembly 120*d*. Thereafter, the processors 110*a* may execute one or more of the modules/applications 110*c*1, 110*c*2 stored in memory 110*c* to process the image data received from the imaging assembly 120*d* and perform object locationing on the objects and object transportation apparatuses represented in the image data received from the assembly 120*d* through the interface 110*b*.

The example processing platform 210 of FIG. 2 also includes input/output (I/O) interfaces 212 to enable receipt of user input and communication of output data to the user. Such user input and communication may include, for example, any number of keyboards, mice, USB drives, optical drives, screens, touchscreens, etc.

Further, the example processing platform 210 may be connected to a remote server 220. The remote server 220 may include one or more remote processors 222, and may be configured to execute instructions to, for example, implement operations of the example methods described herein, as may be represented by the flowcharts of the drawings that accompany this description.

FIGS. 3A-3E depict exemplary embodiments of an imaging device (e.g., imaging device 120) performing object locationing prior to initiating an identification session, in accordance with embodiments described herein. More generally, each of the actions represented in FIGS. 3A-3E may be performed locally by the imaging device and/or at a remote location (e.g., central server 110, workstation 111, POS station 130, external server 150) or combinations thereof. These actions may be or include, for example, capturing image data of customers and object transportation apparatuses at a checkout location, analyzing the image data to determine whether the object transportation apparatus and the objects contained therein are within the FOV of the imaging device and/or are adequately positioned at a target location of the checkout station, initiating/terminating an identification session, generating/transmitting deactivation signals, and/or other suitable actions or combinations thereof.

As previously mentioned, the imaging device may be embedded in a charging cradle for a handheld scanning device, and/or otherwise disposed at the checkout location such that the FOV of the imaging device may capture images of object transportation apparatuses and the objects contained therein. For example, as illustrated in the first exemplary embodiment 300 of FIG. 3A, a handheld scanning device 301*a* may be positioned in a charging cradle that includes the imaging device 301*b*. The imaging device 301*b* has a FOV 302 extending from the charging cradle towards a target location 303. The target location 303 may generally be a location on a floor space of a checkout station, where customers may position an object transportation apparatus. In certain embodiments, the target location 303 may be physically demarcated on the floor space of the checkout station, such as by tape, paint, projected light, and/or by any other suitable means or combinations thereof. However, in certain embodiments, the target location 303 may not be physically demarcated, and the customer may receive instructions regarding positioning/adjusting the location of an object transportation apparatus within the target location 303. The target location 303 may be disposed proximate (e.g., several meters, feet, etc.) to the imaging device 301*b*, and as a result, the imaging device 301*b* may capture image data of the target location and any objects positioned within the target location.

Figure 3A:
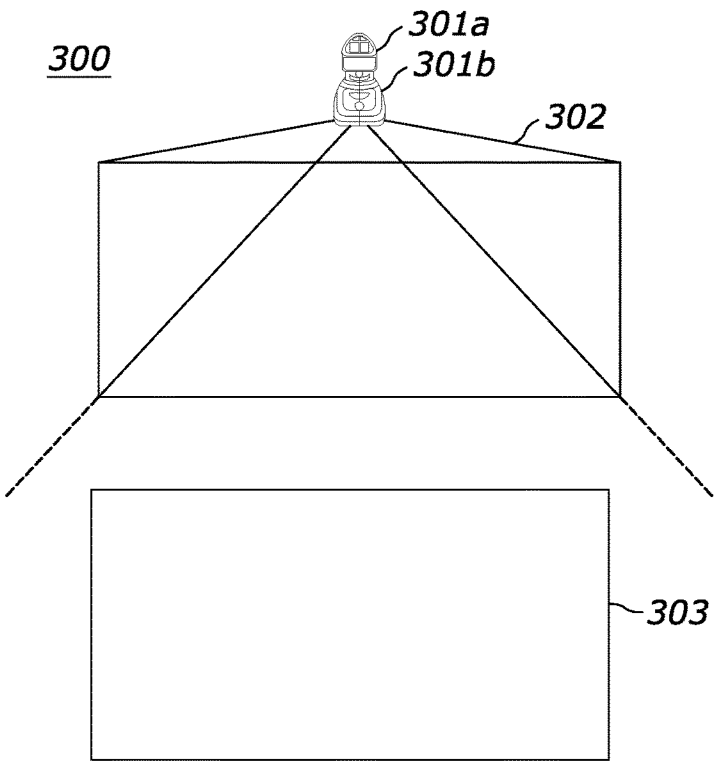
FIGS. 3A-3E depict exemplary embodiments of an imaging device performing object locationing prior to initiating an identification session, in accordance with embodiments described herein.
Figure 3B:
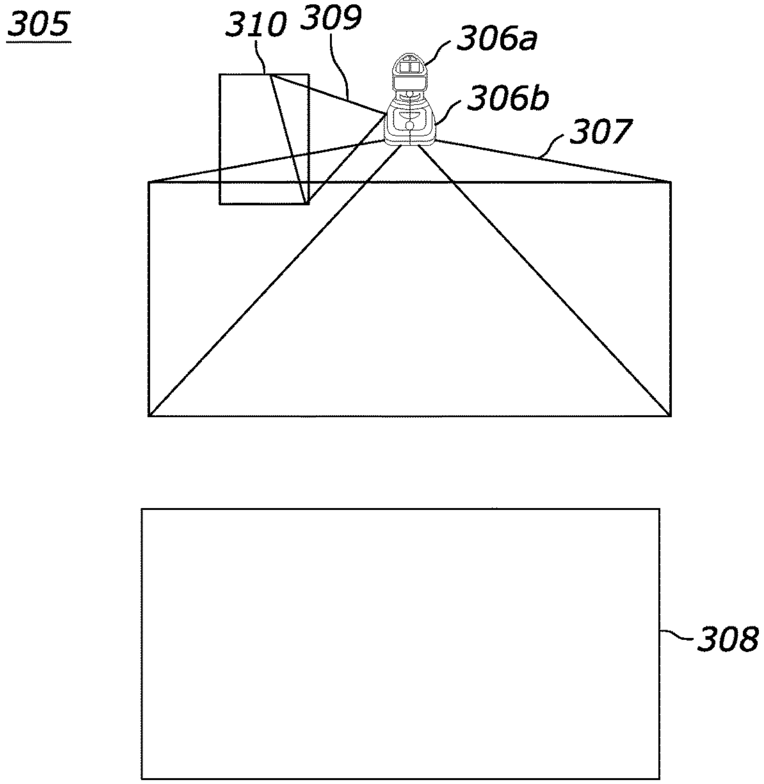

Moreover, as illustrated in the second exemplary embodiment 305 of FIG. 3B, a handheld scanning device 306*a* may be positioned in a charging cradle that includes an imaging device 306*b* that has two FOVs 307, 309. The first FOV 307 may extend in a first direction towards a first target location 308 corresponding to floor space of a checkout station, and images captured of the first FOV 307 may thereby include object transportation apparatuses and the objects contained therein. The second FOV 309 may extend in a second direction towards a second target location 310 corresponding to a basket loading/unloading area of the checkout station.

For example, a first customer may not utilize a shopping cart while shopping in a retail location, but may instead use a basket for smaller/fewer items. When the first customer approaches the checkout station to begin the checkout process, the customer may place the basket in the second target location 310 instead of on the floor space indicated by the first target location 308. Thus, the imaging device 306*b* may still capture image data of the object transportation apparatus (e.g., the basket) through the second FOV 309 to perform the object locationing/dimensioning/identification, as described herein.

In any event, when a customer approaches the checkout station, the imaging device (e.g., imaging devices 301*b*, 306*b*) may capture image data of the customer's object transportation apparatus to determine whether the customer has placed the apparatus in a suitable location to initiate an identification session. Generally, the imaging device may monitor each object located within the object transportation apparatus during an identification session to confirm that each object scanned by the customer/employee correctly corresponds to the information retrieved from scanning the indicia, and that each object located within the object transportation apparatus is scanned during the identification session. In this manner, the imaging device may correlate image data to the object information retrieved by scanning indicia of the objects located within the apparatus to ensure that the identification session has been optimally performed.

Figure 3C:
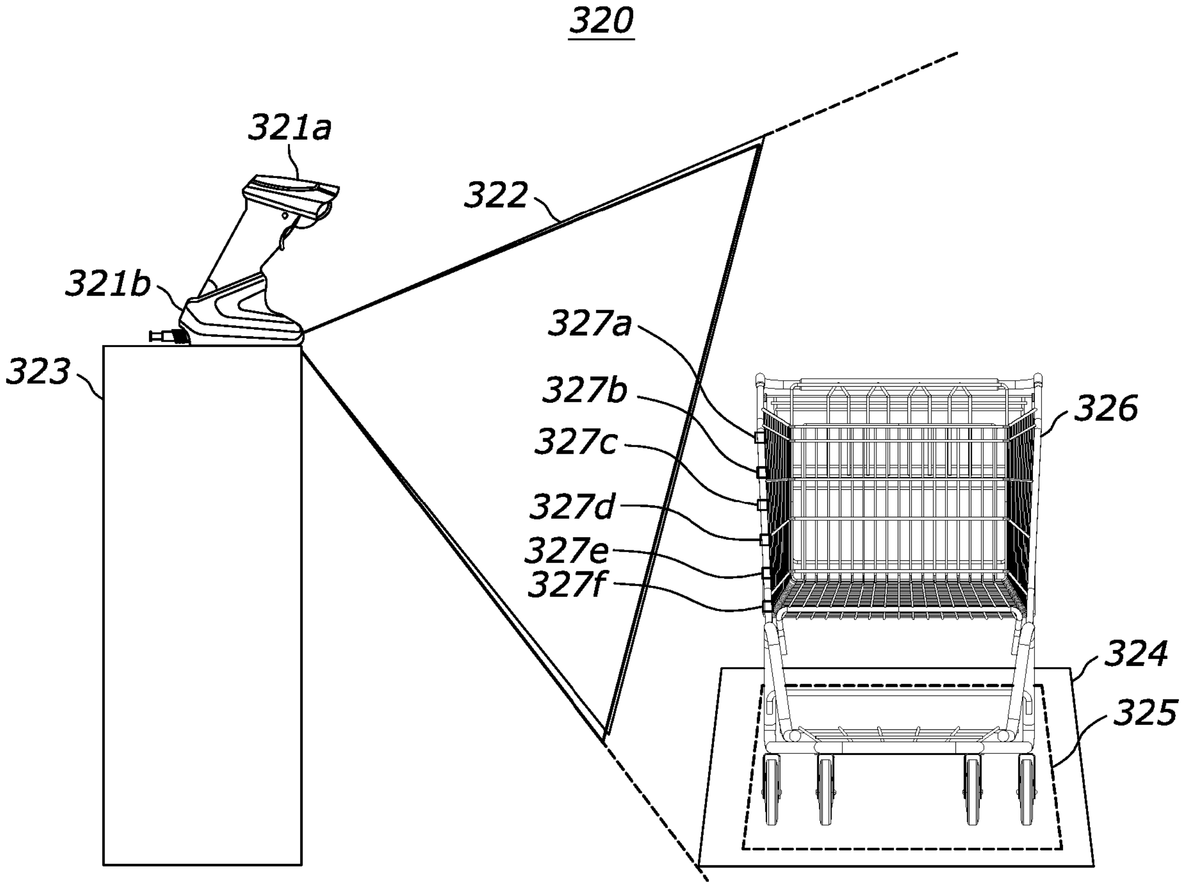

However, as mentioned, the imaging device may confirm that the customer has placed the object transportation apparatus in a suitable location prior to initiating the identification session. In particular, FIG. 3C illustrates a third exemplary embodiment 320 where a handheld scanning device 321*a* is positioned in a charging cradle that includes an imaging device 321*b*. The imaging device 321*b* has a FOV 322 extending toward the target location 324, and the imaging device 321*b* and handheld scanning device 321*a* are generally located on a counter 323 of a checkout station. As illustrated in FIG. 3C, the imaging device 321*b* may be positioned near a front edge of the counter 323 to ensure that the counter 323 does not obscure the FOV 322.

A customer may position an object transportation apparatus 326 within the target location 324, and as a result, the imaging device 321*b* may capture image data of the object transportation apparatus 326. In the exemplary embodiment 320 of FIG. 3C, the customer may have adequately positioned the object transportation apparatus 326 within the target location 324, such that the image data captured by the imaging device 321*b* may indicate that the identification session should be initiated. In particular, the imaging device 321*b* may capture the image data of the object transportation apparatus 326, and the imaging device 321*b* may locally analyze this image data to determine a location of the apparatus 326 relative to the target location 324. Additionally, or alternatively, the imaging device 321*b* may transmit the image data to an external source (e.g., central server 110) for processing. These devices for processing the image data may be collectively referenced herein as the "image data processing device".

Regardless, the image data processing device (e.g., imaging device 321*b*, central server 110, etc.) may process the captured image data to determine (i) whether the object transportation apparatus 326 is located within the target location 324, and (ii) whether each object within the object transportation apparatus 326 is fully contained within the FOV 322. If the object transportation apparatus 326 is not within the target location 324, then a portion of the apparatus 326 may extend beyond the bounds of the FOV 322, and the objects located within that portion of the apparatus 326 may not appear in the image data captured during a subsequent identification session. Similarly, if a portion of the objects contained within the object transportation apparatus 326 are not fully contained within the FOV 322, then the dimensioning and identification performed using the image data may be incorrect and/or otherwise erroneous. Thus, in either case, the results produced by the image data processing device may not align with the object information gathered by scanning indicia of the objects in the object transportation apparatus during the subsequent identification session.

To avoid this, the image data processing device may require the customer to re-position the object transportation apparatus 326, such that the apparatus 326 is located within the target location 324 and each object within the apparatus is fully contained within the FOV 322. However, when the customer adequately positions/adjusts the location of the object transportation apparatus 326, the image data processing device may generate/transmit an identification session initiation signal to a POS station (e.g., POS station 130) or other suitable location to initiate an identification session.

During the identification session, the customer may, for example, remove the handheld scanning device 321*a* from the charging cradle and begin to scan indicia of the objects contained within the object transportation apparatus 326. While the customer proceeds to scan objects within the apparatus 326, the imaging device 321*b* may continue to capture image data of the apparatus 326 and the objects contained therein. This image data captured during the identification session may be analyzed by the image data processing device to determine dimensions of the apparatus and each object contained therein. Using these dimensions, the image data processing device may determine predicted object identifications for the objects contained within the apparatus 326.

For example, the image data captured by the imaging device (e.g., imaging device 321*b*) may represent a large polyvinyl chloride (PVC) pipe (not shown) within the object transportation apparatus 326. The image data processing device may process the image data and determine dimensions of the object transportation apparatus 326 based on known distances/dimensions of the apparatus 326 and the target location 324, as discussed further herein. Using these dimensions, the image data processing device may determine that the PVC pipe has certain dimensions based on the dimensions of the apparatus 326, as represented in the captured image data. Additionally, or alternatively, the image data processing device may determine dimensions of the PVC pipe independent of the dimensions determined/known for the object transportation apparatus 326 and/or the target location 324.

As a simple example, the apparatus 326 may have a length dimension of the basket portion (e.g., of a cart) of roughly three feet, and this length dimension may be represented in the image data as X number of pixels across. In this example, the PVC pipe contained within the apparatus 326 may extend along the entire length of the basket portion and may be represented in the image data as approximately X pixels along the length dimension of the pipe. Accordingly, the image data processing device may determine that a length dimension of the PVC pipe is approximately three feet. Based on this three-foot length dimension, along with other data included in the image data (e.g., color, contrast, etc.), the image data processing device may determine that the object represented in the image data is a three-foot length of PVC pipe, and may compare this determination with object identification data retrieved/obtained through scanning an indicia associated with the object. Of course, it should be appreciated that the image data processing device may perform dimensioning of the object transportation apparatus 326 and/or objects within the apparatus 326 in any suitable manner.

As another example, and in certain embodiments, the object transportation apparatus 326 may include dimension features 327*a-f* that enable the image data processing device to determine dimensions of the object transportation apparatus 326 and/or objects contained therein based on the relative size/distance between respective features 327*a-f* in the image data. The dimension features 327*a-f* may be tape, paint, projected light, and/or any other suitable features that may be visible in the captured image data. The image data processing device may analyze the captured image data, identify the dimension features 327*a-f*, and may compare the size of the features 327*a-f* and/or distances between the features 327*a-f* represented in the image data to the known dimensions/distances of the features 327*a-f*.

To illustrate, each of the dimension features 327*a-f* may be square tape pieces disposed on the object transportation apparatus 326 of approximately two inches by two inches in size, and may be spaced apart from one another by approximately four inches along the frame of the apparatus 326. Thus, the image data processing device may determine a conversion rate between the size or number of pixels representing the dimensions/distances of the dimension features 327*a-f* and the known dimensions of the features 327*a-f*. Thereafter, the image data processing device may apply the conversion rate to numbers of pixels or other dimensions represented in the image data corresponding to objects contained in the object transportation apparatus 326 to determine approximate real-world dimensions of the objects.

When the image data processing device has analyzed the image data to determine approximate dimensions of objects contained within the object transportation apparatus, the image data processing device may correlate and/or otherwise associate that dimensioning data with known dimensions of objects on-sale or otherwise available to customers in the retail location to identify the objects. The on-sale and/or otherwise available objects may be stored in a database that is accessible to the image data processing device, and the database may include additional information corresponding to each object, such as dimensions, colors, quantity in stock, etc. Thus, the image data processing device may retrieve and/or access this information for each object which has dimensions and other characteristics (e.g., color) represented in the image data. For example, the image data processing device may input the dimension data and other characteristics data into a trained model (e.g., a trained ML model of the object locationing module 110*c*2, 120*c*2) to determine a predicted object that is included in the database. The image data processing device may then compare this predicted object to a reference list of scanned objects that the customer has populated by virtue of scanning indicia associated with each object contained within the object transportation apparatus 326. If there is a match, then the image data processing device may take no further actions.

However, if there is no match that satisfies a confidence threshold, then the image data processing device may perform a mitigation action, such as generating/transmitting a deactivation signal to the unscanned object(s). For example, the object transportation apparatus 326 may contain an electric power tool that may be deactivated (i.e., rendered inoperable) if the indicia of the electric power tool is not identified in the reference list of scanned indicia and/or may require an activation signal to be operable. In this example, the imaging device 321*b* may capture image data that includes a representation of the electric power tool, and the image data processing device may identify the power tool, in accordance with the dimensioning/identification actions described herein. The image data processing device may then check the reference list of scanned indicia to determine whether the electric power tool has been scanned by the customer, and may determine that the indicia is not present on the reference list. Upon identifying the discrepancy, the image data processing device may immediately generate/transmit an alert signal to the customer and/or store employees, but may also wait until the end of the identification session before doing so to allow the customer an opportunity to scan the indicia of the electric power tool during the identification session. Nevertheless, if the customer terminates the identification session without scanning the indicia of the electric power tool, the image data processing device (or other suitable device) may generate/transmit a deactivation signal to the power tool to prevent the power tool from working and/or may not transmit the activation signal to prevent the power tool from operating.

As part of the process of checking scanned indicia during the identification session, the third exemplary embodiment 320 also includes an optional detection device 325. This device 325 may be or include, for example, a radio frequency identification (RFID) detector, a metal detector, a weight scale, and/or any other suitable device or combinations thereof that may be embedded into the floor space under the target location 324. The device 325 may thereby provide another check against the outputs of the image data processing device, such as by checking the identified objects in the image data against RFID tags detected for the corresponding objects in the object transportation apparatus 326.

Of course, it should be understood that the object locationing/dimensioning/identification actions described above and herein may be performed at any suitable time before and/or during an identification session. Moreover, object identification may take place independent of and/or before dimensioning of the object. For example, the image data may indicate a particular power tool, which the image data processing device is able to identify without determining dimensions of the object. When the image data processing device identifies the particular power tool, the device may subsequently retrieve relevant information for the power tool (e.g., dimensions) from the database storing such object information. Additionally, it should be appreciated that the database storing object information may include any suitable data corresponding to objects located within the retail location, such as universal product codes (UPCs), price, dimensions, color, weight, and/or any other suitable data or combinations thereof.

In any event, as mentioned, and prior to initiating an identification session, the imaging device (e.g., imaging device 321*b*) may capture image data of the object transportation apparatus (e.g., apparatus 326) and any objects contained therein to ensure that the apparatus and objects are fully visible by and appropriately distanced from the imaging device. In particular, FIGS. 3D and 3E represent exemplary embodiments where a customer has placed the object transportation apparatus in a non-optimal location, and thereby requires adjustment.

Figure 3D:
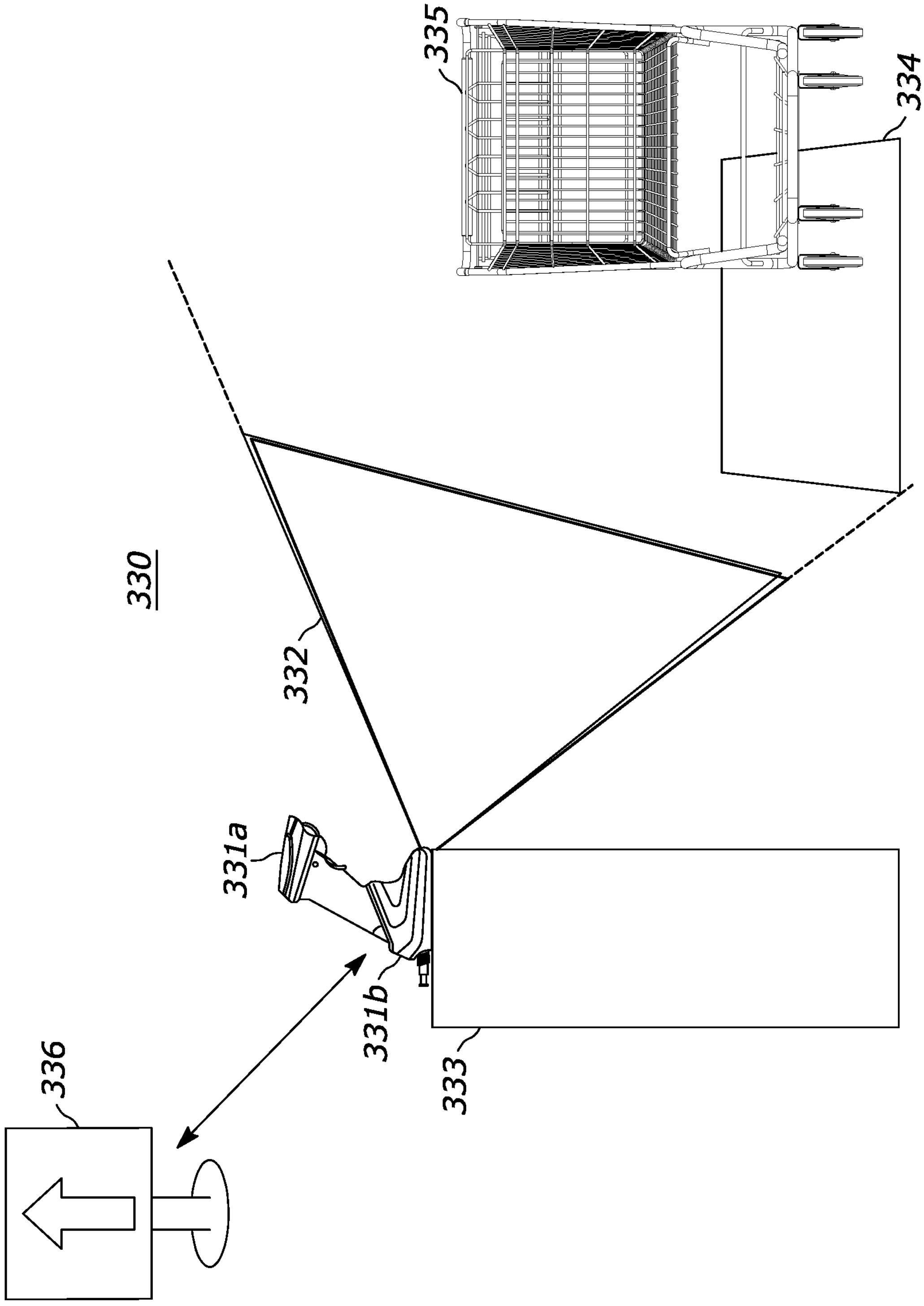

As illustrated in FIG. 3D, the fourth exemplary embodiment 330 includes a handheld scanning device 331*a* positioned in a charging cradle that includes an imaging device 331*b* that has an FOV 332 extending towards a target location 334 corresponding to floor space of a checkout station, such that images captured of the FOV 332 may thereby include object transportation apparatuses and the objects contained therein. The handheld scanning device 331*a* and the imaging device 331*b* are disposed on a counter 333 of the checkout station, and the imaging device 331*b* may be communicatively coupled with a display 336 (e.g., a monitor). When the image data processing device analyzed the captured image data from the imaging device 331*b*, the processing device may determine that the object transportation apparatus 335 may need to be re-positioned into the target location 334. The display 336 may then display instructions intended for viewing by the user to guide the user to re-position the object transportation apparatus 335 into an appropriate location within the target location 334.

For example, the customer may position the object transportation apparatus 335 in the location as illustrated in FIG. 3D. The image data captured by the imaging device 331*b* may indicate that the apparatus 335 is positioned too far away from the imaging device 331*b* based on the distance between the front edge (relative to the imaging device 331*b*) of the target location 334 and a front surface of the object transportation apparatus 335. Thus, the image data processing device may cause an instruction to render on the display 336 indicating to a user to move the object transportation apparatus 335 closer to the imaging device 331*b* and into the target location 334.

Figure 3E:
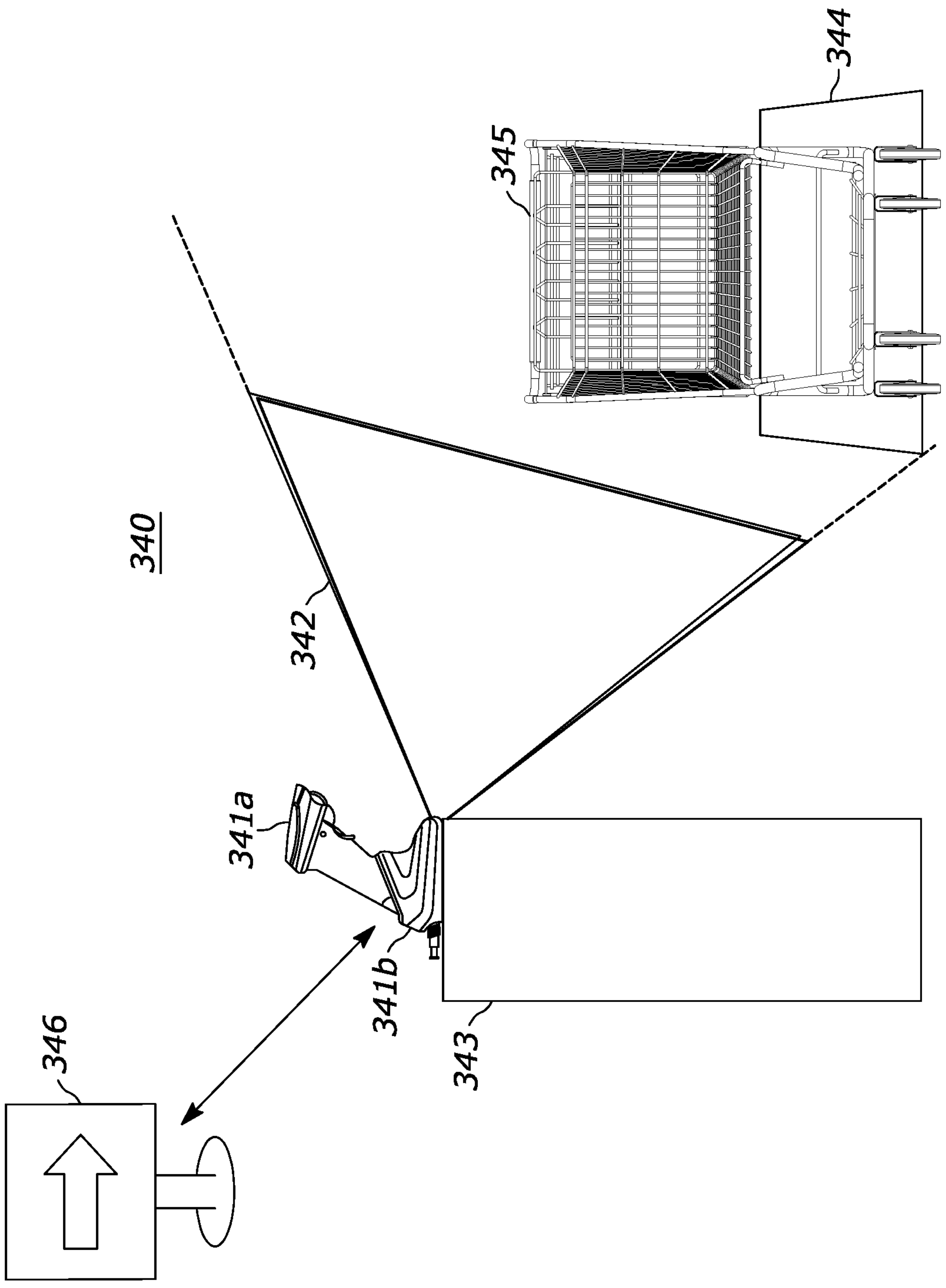

Moreover, as illustrated in FIG. 3E, the fifth exemplary embodiment 340 includes a handheld scanning device 341*a* positioned in a charging cradle that includes an imaging device 341*b* that has an FOV 342 extending towards a target location 344 corresponding to floor space of a checkout station, such that images captured of the FOV 342 may thereby include object transportation apparatuses and the objects contained therein. The handheld scanning device 341*a* and the imaging device 341*b* are disposed on a counter 343 of the checkout station, and the imaging device 341*b* may be communicatively coupled with a display 346 (e.g., a monitor). When the image data processing device analyzed the captured image data from the imaging device 341*b*, the processing device may determine that the object transportation apparatus 345 may need to be re-positioned into the target location 344. The display 346 may then display instructions intended for viewing by the user to guide the user to re-position the object transportation apparatus 345 into an appropriate location within the target location 344.

For example, the customer may position the object transportation apparatus 345 in the location as illustrated in FIG. 3E. The image data captured by the imaging device 341*b* may indicate that the apparatus 345 is positioned too far to the right of the target location 344 relative to the FOV 342 based on the rear wheels of the apparatus 345 being positioned outside of the target location 344. Thus, the image data processing device may cause an instruction to render on the display 346 indicating to a user to move the object transportation apparatus 345 to the right relative to the imaging device 341*b* and into the target location 344.

Figure 4:
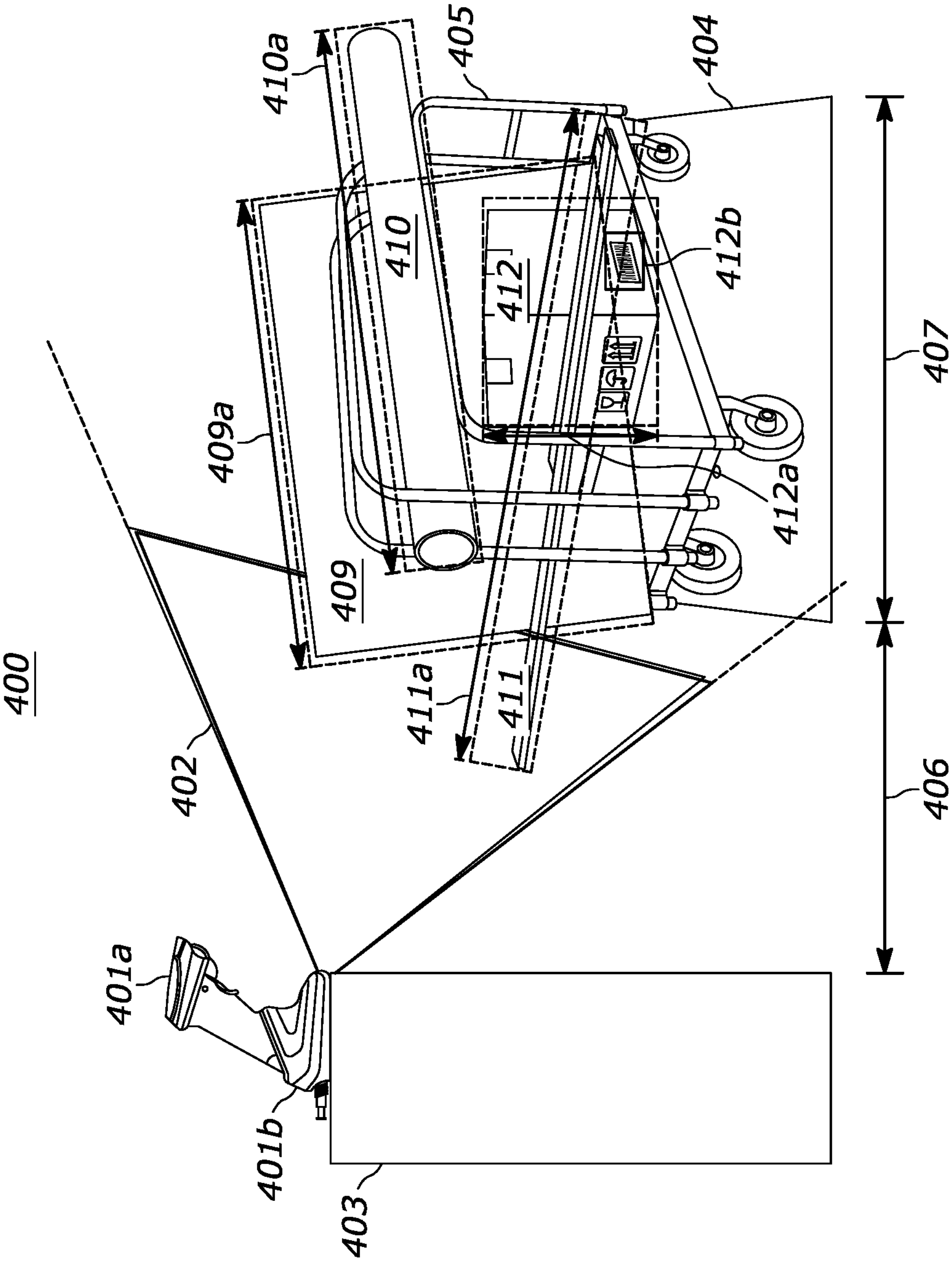
FIG. 4 depicts an exemplary embodiment of an imaging device performing object locationing during an identification session, in accordance with embodiments described herein.

FIG. 4 depicts an exemplary embodiment 400 of an imaging device 401*b* performing object locationing and identification during an identification session, in accordance with embodiments described herein. The exemplary embodiment 400 generally includes a handheld scanning device 401*a* positioned in a charging cradle that includes an imaging device 401*b* that has an FOV 402 extending towards a target location 404 corresponding to floor space of a checkout station, such that images captured of the FOV 402 may thereby include object transportation apparatuses and the objects contained therein. The handheld scanning device 401*a* and the imaging device 401*b* may be disposed on a counter 403 of the Generally, as illustrated in FIG. 4, the imaging device 401*b* may face in a slightly downward orientation, such that the FOV 402 has full visibility of the object transportation apparatus 405. The vision applications executing on the image data processing device may then identify any large items (e.g., items 409, 410) and/or items that are positioned on a low-lying area or beneath the apparatus 405 (e.g., item 412), which must be scanned. In particular, and as previously mentioned, the image data processing device may determine approximate dimensions of objects that may not have identifying features, such as lumber, pipes, plywood, and/or other miscellaneous construction materials based on known distances of, for example, the target location 404 from the counter 403 (e.g., distance 406).

Regardless, when the object transportation apparatus 405 is appropriately positioned within the target location 404, the image data processing device may generate/transmit an identification session initiation signal to initiate an identification session. The customer may then remove the handheld scanning device 401*a* from the charging cradle, and the image data processing device may compare the scanned indicia (e.g., resulting in UPCs for scanned objects) to ensure that an indicia associated with each dimensioned or identified item was scanned. If not, the image data processing device may initiate a mitigation action, such as generating an alert signal, a deactivation signal, and/or any other suitable mitigation action or combinations thereof.

Further, this configuration illustrated in FIG. 4 may also enable the image data processing device to check for correspondence between scanned objects and imaged objects if the customer chooses to utilize the handheld scanning device 401*a* in presentation mode. When in presentation mode, the imaging systems utilized to scan indicia may be passively active until an object is detected within the FOV of the handheld scanning device 401*a*, at which time, the handheld scanning device 401*a* may capture image data of the object and attempt to decode an indicia. Thus, when the customer utilizes the handheld scanning device 401*a* in this presentation mode, the image data processing device may identify the object being held up to the handheld scanning device 401*a*, and may check that the obtained UPC or other identifying information resulting from scanning the indicia matches the identification obtained through captured image data analysis.

In certain embodiments, the imaging device 401*b* may further include a second camera (not shown) that is disposed in a different location than the charging cradle to capture objects in the object transportation apparatus 405 that may be blocked or obscured by larger objects in the apparatus 405. For example, the second camera may be disposed above the imaging device 401*b*, on an opposite side of the apparatus 405 from the imaging device 401*b*, and/or in any other suitable location. Further, in certain embodiments, the imaging device 401*b* may be or include a 3D camera or depth camera, the image data of which, the image data processing device may use to determine accurate object dimensions for checking against the information obtained from scanning indicia of the objects.

In any event, when the imaging device 401*b* captures image data of the object transportation apparatus 405 and the objects 409-412 contained therein, the image data processing device may determine dimensions of these objects 409-412. For example, the image data processing device may utilize the known distance between the counter 403 and the target location 404 (e.g., distance 406), the depth of the target location 404 (e.g., distance 407), and known dimensions of the apparatus 405 to determine the dimensions of the objects 409-412 contained therein.

To illustrate, the image data processing device may receive image data representing the object transportation apparatus 405 and the objects 409-412 contained therein. The image data processing device may utilize the known dimensions of the object transportation apparatus 405 to determine a conversion factor between the pixel values of a particular object and the corresponding real-world dimension associated with that particular object. Based on this conversion factor (e.g., X number of pixels corresponds to Y inches/feet/meters in real-world dimension), the image data processing device may determine dimensions 409*a* of the sheet of plywood, dimensions 410*a* of the pipe, dimensions 411*a* of the wooden plank 411, and dimensions 412*a* of the cardboard box 412.

Additionally, in certain embodiments, the image data processing device may be able to identify and/or decode indicia within the captured image data. For example, the captured image data may include the indicia 412*b* associated with the cardboard box 412. The image data processing device may identify this indicia 412*b*, attempt to decode the indicia 412*b*, and with sufficient image quality, may decode the indicia 412*b*. In these embodiments, the image data processing device may provide a direct basis for comparison between decoded indicia from the identified object 412 from the image data and the scanned indicia information the customer captures using the handheld scanning device 401*a*.

Figure 5:
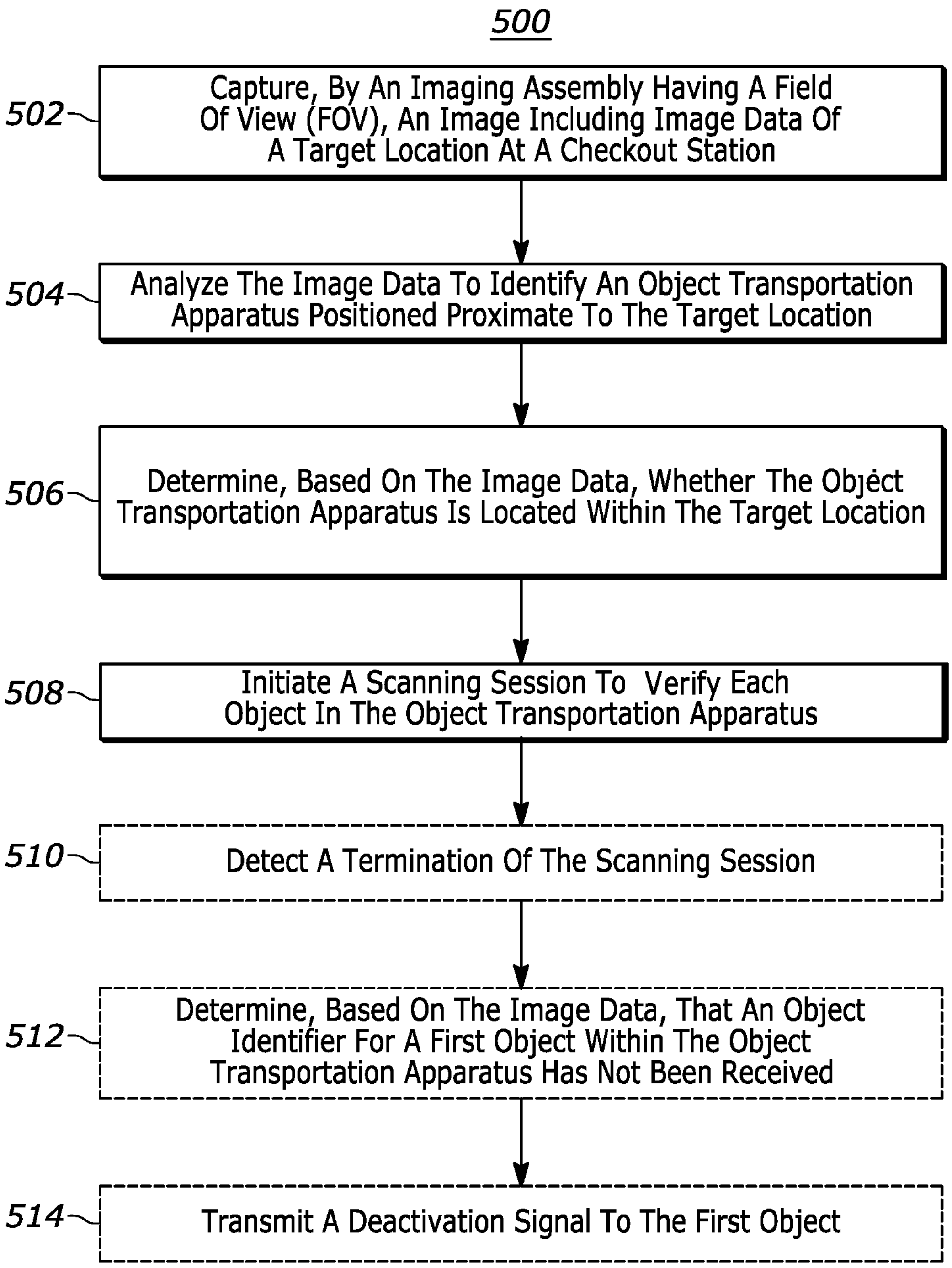
FIG. 5 is a flowchart representative of a method for object locationing to initiate an identification session, in accordance with embodiments described herein.

FIG. 5 is a flowchart representative of a method 500 for object locationing to initiate an identification session, in accordance with embodiments described herein. It is to be understood that any of the steps of the method 500 may be performed by, for example, the central server 110, the workstation 111, the imaging device 120, the POS station 130, the external server 150, and/or any other suitable components or combinations thereof discussed herein.

At block 502, the method 500 includes capturing, by an imaging assembly having a field of view (FOV), an image including image data of a target location at a checkout station. At block 504, the method 500 includes analyzing the image data to identify an object transportation apparatus positioned proximate to the target location. At block 506, the method 500 includes determining, based on the image data, whether the object transportation apparatus is located within the target location. At block 508, the method 500 includes initiating an identification session to verify that each object in the object transportation apparatus is included on a list of decoded indicia.

In certain embodiments, the method 500 further comprises: compiling, based on the image data, a list of object characteristics corresponding to one or more characteristics of each object within the object transportation apparatus; and compiling, during the identification session, a list of decoded indicia including indicia of objects within the object transportation apparatus. Further in these embodiments, the method 500 may include detecting a termination of the identification session (block 510). Still further, the method 500 may include comparing the list of decoded indicia to the list of object characteristics to determine whether a set of object characteristics included on the list of object characteristics do not have a corresponding decoded indicia in the list of decoded indicia (block 512). For example, as previously mentioned, the object characteristics may include object dimensions, color, textures, and/or other suitable characteristics or combinations thereof. The central server 110 or other suitable processor may recognize a predicted object based on the set of object characteristics, and may attempt to validate the presence of the object based on determining that a user has scanned/decoded an indicia corresponding to the object.

In any event, the method 500 may further include, responsive to determining that (i) an indicia is not matched with one or more object characteristics or (ii) one or more object characteristics are not matched with an indicia, activating a mitigation (block 514). For example, the mitigation may be or include one or more of: (i) marking a receipt, (ii) triggering an alert, (iii) storing video data corresponding to the identification session (e.g., security camera footage), (iv) notifying a user, (v) a deactivation signal, (vi) an activation signal, (vii) transmitting an indicia to a point of sale (POS) host to include the indicia on the list of decoded indicia.

In certain embodiments, the method 500 includes determining whether the object transportation apparatus is located within the target location further comprises: determining, based on the image data, whether (i) the object transportation apparatus is located within the target location and (ii) each object within the object transportation apparatus is fully contained within the FOV; and responsive to determining that either (i) the object transportation apparatus is not located within the target location or (ii) one or more objects within the object transportation apparatus are not fully contained within the FOV, displaying, on a user interface, an alert indicating a direction for a user to move the object transportation apparatus.

In some embodiments, the method 500 further includes analyzing the image data further comprises: identifying a floor marking that delineates the target location on a floor of the checkout station; and determining whether the object transportation apparatus is located within the target location further comprises: determining whether the object transportation apparatus is located within the floor marking on the floor of the checkout station. Further in this embodiment, the floor marking is a pattern projected onto the floor of the checkout station by one or more of: (a) an overhead lighting device, (b) a cradle lighting device, or (c) a lighting device mounted at a point of sale (POS) station.

In certain embodiments, the method 500 further includes determining, based on the image data, whether the object transportation apparatus is located within the target location further comprises: determining whether a detection signal from a second device corresponds to the object transportation apparatus being located within the target location, wherein the second device is (a) a metal detector, (b) a radio frequency identification (RFID) detector, (c) a Near Field Communications (NFC) beacon, or (d) a Bluetooth® Low Energy (BLE) beacon.

In some embodiments, the method 500 may further include detecting, by an RFID detector during the identification session, an obscured object that is within the object transportation apparatus and is obscured from the FOV; and obtaining, by the RFID detector, an object identifier for the obscured object.

In certain embodiments, the imaging assembly is disposed within a charging cradle for a handheld scanning apparatus, the charging cradle being disposed proximate to a counter edge of the checkout station.

In some embodiments, the imaging assembly is a two-dimensional (2D) camera, the image data is 2D image data of the target location and the object transportation apparatus, and wherein determining whether the object transportation apparatus is located within the target location further comprises: determining that a front edge, a left edge, and a right edge of the target location are unobscured in the 2D image data; determining a first dimension of the object transportation apparatus based on a plurality of features on the object transportation apparatus; comparing the first dimension to a known dimension of the object transportation apparatus; and responsive to determining that (i) the first dimension is substantially similar to the known dimension and (ii) that the front edge, the left edge, and the right edge of the target location are unobscured, determining that the object transportation apparatus is located within the target location. Further in this embodiment, the method 500 may further include determining a relative dimension of each object within the object transportation apparatus based on the plurality of features on the object transportation apparatus.

In certain embodiments, the imaging assembly is a three-dimensional (3D) camera, the image data is 3D image data of the target location and the object transportation apparatus, and wherein determining whether the object transportation apparatus is located within the target location further comprises: determining that a front edge, a left edge, and a right edge of the target location are unobscured in the 3D image data; determining a distance of a proximate face of the object transportation apparatus from the imaging assembly based on depth information included as part of the 3D image data corresponding to the object transportation apparatus; comparing the distance of the proximate face of the object transportation apparatus from the imaging assembly to a known distance of a proximate edge of the target location; and responsive to determining that (i) the distance of the proximate face is substantially similar to the known distance of the proximate edge and (ii) that the front edge, the left edge, and the right edge of the target location are unobscured, determining that the object transportation apparatus is located within the target location.

In some embodiments, the object transportation apparatus is a shopping cart, and the method 500 may further include detecting, based on the image data, a first object under a basket portion of the shopping cart; and determining, during the identification session, that a user has moved a scanning device sufficient to scan the first object, wherein the determining is based on one or more of: (i) an internal accelerometer signal, (ii) an elevation sensor signal, (iii) image data indicating that the scanning device is positioned to capture data of the first object, or (iv) signal data from a second device.

In certain embodiments, the imaging assembly is disposed within a handheld scanning apparatus, and the image is captured prior to decoupling the handheld scanning apparatus from a holding base (e.g., imaging device 301*b* included in charging cradle).

Of course, it is to be appreciated that the actions of the method 500 may be performed any suitable number of times, and that the actions described in reference to the method 500 may be performed any suitable number of times and in any suitable order.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for object locationing to initiate an identification session, comprising:

capturing, by a first imager of an imaging assembly, an image including image data of a target location at a checkout station;

analyzing the image data to identify an object transportation apparatus positioned proximate to the target location;

determining, based on the image data, whether the object transportation apparatus is located within the target location; and responsive to determining that the object transportation apparatus is located within the target location, initiating, by a second imager of the imaging assembly, an identification session to verify that each object in the object transportation apparatus is included on a list of decoded indicia, wherein determining whether the object transportation apparatus is located within the target location further comprises:

determining, based on the image data, whether (i) the object transportation apparatus is located within the target location and (ii) each object within the object transportation apparatus is fully contained within a field of view (FOV) of the first imager; and responsive to determining that either (i) the object transportation apparatus is not located within the target location or (ii) one or more objects within the object transportation apparatus are not fully contained within the FOV, displaying, on a user interface, an alert indicating a direction for a user to move the object transportation apparatus.

2. The method of claim 1, wherein the imaging assembly comprises the second imager being disposed within a handheld scanning apparatus and the first imager being disposed within a base configured to receive the handheld scanning apparatus.

3. The method of claim 1, wherein:

analyzing the image data further comprises:

identifying a floor marking that delineates the target location on a floor of the checkout station; and determining whether the object transportation apparatus is located within the target location further comprises:

determining whether the object transportation apparatus is located within the floor marking on the floor of the checkout station.

4. The method of claim 3, wherein the floor marking is a pattern projected onto the floor of the checkout station by one or more of: (a) an overhead lighting device, (b) a cradle lighting device, or (c) a lighting device mounted at a point of sale (POS) station.

5. The method of claim 1, wherein determining, based on the image data, whether the object transportation apparatus is located within the target location further comprises:

determining whether a detection signal from a device corresponds to the object transportation apparatus being located within the target location, wherein the device is (a) a metal detector, (b) a radio frequency identification (RFID) detector, (c) a Near Field Communications (NFC) beacon, or (d) a Bluetooth® Low Energy (BLE) beacon.

6. The method of claim 1, further comprising:

compiling, based on the image data, a list of object characteristics corresponding to one or more characteristics of each object within the object transportation apparatus;

compiling, during the identification session, a list of decoded indicia including indicia of objects within the object transportation apparatus;

detecting a termination of the identification session;

comparing the list of decoded indicia to the list of object characteristics; and responsive to determining that (i) an indicia is not matched with one or more object characteristics or (ii) one or more object characteristics are not matched with an indicia, activating a mitigation.

7. The method of claim 6, wherein the mitigation includes one or more of: (i) marking a receipt, (ii) triggering an alert, (iii) storing video data corresponding to the identification session, (iv) notifying a user, (v) a deactivation signal, (vi) an activation signal, (vii) transmitting an indicia to a point of sale (POS) host to include the indicia on the list of decoded indicia.

8. The method of claim 1, further comprising:

detecting, by an RFID detector during the identification session, an obscured object that is within the object transportation apparatus and is obscured from an FOV of the first imager; and obtaining, by the RFID detector, an object identifier for the obscured object.

9. The method of claim 1, wherein the first imager is disposed within a base configured to receive a handheld scanning apparatus, the base being fixedly attached to a counter edge of the checkout station.

10. The method of claim 1, wherein the first imager is a two-dimensional (2D) camera, the image data is 2D image data of the target location and the object transportation apparatus, and wherein determining whether the object transportation apparatus is located within the target location further comprises:

determining that a front edge, a left edge, and a right edge of the target location are unobscured in the 2D image data;

determining a first dimension of the object transportation apparatus based on a plurality of features on the object transportation apparatus;

comparing the first dimension to a known dimension of the object transportation apparatus; and responsive to determining that (i) the first dimension is substantially similar to the known dimension and (ii) that the front edge, the left edge, and the right edge of the target location are unobscured, determining that the object transportation apparatus is located within the target location.

11. The method of claim 10, further comprising:

determining a relative dimension of each object within the object transportation apparatus based on the plurality of features on the object transportation apparatus.

12. The method of claim 1, wherein the first imager is a three-dimensional (3D) camera, the image data is 3D image data of the target location and the object transportation apparatus, and wherein determining whether the object transportation apparatus is located within the target location further comprises:

determining that a front edge, a left edge, and a right edge of the target location are unobscured in the 3D image data;

determining a distance of a proximate face of the object transportation apparatus from the imaging assembly based on depth information included as part of the 3D image data corresponding to the object transportation apparatus;

comparing the distance of the proximate face of the object transportation apparatus from the imaging assembly to a known distance of a proximate edge of the target location; and responsive to determining that (i) the distance of the proximate face is substantially similar to the known distance of the proximate edge and (ii) that the front edge, the left edge, and the right edge of the target location are unobscured, determining that the object transportation apparatus is located within the target location.

13. The method of claim 1, wherein the object transportation apparatus is a shopping cart, and the method further comprises:

detecting, based on the image data, a first object under a basket portion of the shopping cart; and determining, during the identification session, that a user has moved a scanning device sufficient to scan the first object, wherein the determining is based on one or more of: (i) an internal accelerometer signal, (ii) an elevation sensor signal, (iii) image data indicating that the scanning device is positioned to capture data of the first object, or (iv) signal data from a second device.

14. The method of claim 1, wherein the first imager is disposed within a handheld scanning apparatus, and the image is captured prior to decoupling the handheld scanning apparatus from a base.

15. An imaging device for object locationing to initiate an identification session, comprising:

an imaging assembly having a first imager and a second imager, the first imager being configured to capture an image including image data of a target location at a checkout station; and one or more processors communicatively coupled with the imaging assembly that are configured to:

analyze the image data to identify an object transportation apparatus positioned proximate to the target location, determine, based on the image data, whether the object transportation apparatus is located within the target location, and responsive to determining that the object transportation apparatus is located within the target location, initiate, by the second imager, an identification session to verify that each object in the object transportation apparatus is included on a list of decoded indicia, wherein the imaging device further comprises a user interface, and the one or more processors are further configured to:

determine, based on the image data, whether (i) the object transportation apparatus is located within the target location and (ii) each object within the object transportation apparatus is fully contained within a FOV of the first imager; and responsive to determining that either (i) the object transportation apparatus is not located within the target location or (ii) one or more objects within the object transportation apparatus are not fully contained within the FOV, display, on the user interface, an alert indicating a direction for a user to move the object transportation apparatus.

16. The imaging device of claim 15, wherein the imaging assembly comprises a handheld scanning apparatus and a base configured to receive the handheld scanning apparatus, the first imager is disposed within the base, and the second imager is disposed within the handheld scanning apparatus.

17. The imaging device of claim 15, wherein the first imager is a three-dimensional (3D) camera, the image data is 3D image data of the target location and the object transportation apparatus, and wherein the one or more processors are further configured to determine whether the object transportation apparatus is located within the target location by:

determining that a front edge, a left edge, and a right edge of the target location are unobscured in the 3D image data;

determining a distance of a proximate face of the object transportation apparatus from the imaging assembly based on depth information included as part of the 3D image data corresponding to the object transportation apparatus;

comparing the distance of the proximate face of the object transportation apparatus from the imaging assembly to a known distance of a proximate edge of the target location; and responsive to determining that (i) the distance of the proximate face is substantially similar to the known distance of the proximate edge and (ii) that the front edge, the left edge, and the right edge of the target location are unobscured, determining that the object transportation apparatus is located within the target location.

18. A tangible machine-readable medium comprising instructions for object locationing to initiate an identification session that, when executed, cause a machine to at least:

receive an image including image data of a target location within a field of view (FOV) of a first imager of an imaging assembly positioned at a checkout station;

analyze the image data to identify an object transportation apparatus positioned proximate to the target location;

determine, based on the image data, whether the object transportation apparatus is located within the target location; and responsive to determining that the object transportation apparatus is located within the target location, initiate, by a second imager of the imaging assembly, an identification session to verify that each object in the object transportation apparatus is included on a list of decoded indicia, wherein the machine is further configured to:

determine, based on the image data, whether (i) the object transportation apparatus is located within the target location and (ii) each object within the object transportation apparatus is fully contained within a FOV of the first imager; and responsive to determining that either (i) the object transportation apparatus is not located within the target location or (ii) one or more objects within the object transportation apparatus are not fully contained within the FOV, display, on the user interface, an alert indicating a direction for a user to move the object transportation apparatus.

* * * * *